United States Patent
Hellwig et al.

(10) Patent No.: US 9,558,777 B2
(45) Date of Patent: Jan. 31, 2017

(54) HEAT ASSISTED MAGNETIC RECORDING (HAMR) MEDIA HAVING A HIGHLY ORDERED CRYSTALLINE STRUCTURE

(71) Applicant: HGST Netherlands B.V., Amsterdam (NL)

(72) Inventors: Olav Hellwig, San Jose, CA (US); Shikha Jain, San Jose, CA (US); Oleksandr Mosendz, San Jose, CA (US); Hans J. Richter, Palo Alto, CA (US); Dieter K. Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 77 days.

(21) Appl. No.: 14/555,496

(22) Filed: Nov. 26, 2014

(65) Prior Publication Data
US 2016/0148632 A1    May 26, 2016

(51) Int. Cl.
*G11B 5/66* (2006.01)
*G11B 5/73* (2006.01)
*G11B 5/65* (2006.01)

(52) U.S. Cl.
CPC . *G11B 5/66* (2013.01); *G11B 5/65* (2013.01); *G11B 5/732* (2013.01)

(58) Field of Classification Search
None
See application file for complete search history.

(56) References Cited

U.S. PATENT DOCUMENTS

| | | |
|---|---|---|
| 5,530,609 A | 6/1996 | Koga et al. |
| 6,534,203 B2 | 3/2003 | Iwasaki et al. |
| 6,650,513 B2 | 11/2003 | Fullerton et al. |
| 6,826,131 B2 | 11/2004 | Kawaguchi et al. |
| 6,881,497 B2 | 4/2005 | Coffey et al. |
| 7,625,643 B2 | 12/2009 | Umeda et al. |
| 7,846,564 B2 | 12/2010 | Li et al. |
| 7,862,912 B2 | 1/2011 | Hellwig et al. |

(Continued)

FOREIGN PATENT DOCUMENTS

| | | |
|---|---|---|
| WO | 2011021652 A1 | 2/2011 |
| WO | 2011034499 A1 | 3/2011 |

OTHER PUBLICATIONS

Restriction/Election Requirement from U.S. Appl. No. 13/417,032, dated Mar. 13, 2013.

(Continued)

*Primary Examiner* — Kevin Bernatz
(74) *Attorney, Agent, or Firm* — Zilka-Kotab, PC

(57) ABSTRACT

According to one embodiment, a magnetic recording medium includes: a substrate, a seed layer positioned above the substrate, and a magnetic recording layer structure positioned above the seed layer. The magnetic recording layer structure includes: a first magnetic recording layer having a plurality of FePtCu magnetic grains and a first segregant, and a second magnetic recording layer positioned above the first magnetic recording layer, the second magnetic recording layer having a plurality of FePt magnetic grains and a second segregant, where a Curie temperature of the first magnetic recording layer is lower than a Curie temperature of the second magnetic recording layer.

24 Claims, 18 Drawing Sheets

(56) References Cited

U.S. PATENT DOCUMENTS

| | | | |
|---|---|---|---|
| 8,081,542 B1* | 12/2011 | Grobis | B82Y 10/00 360/131 |
| 8,263,239 B2 | 9/2012 | Berger et al. | |
| 8,277,961 B2 | 10/2012 | Watanabe | |
| 8,279,739 B2 | 10/2012 | Kanbe et al. | |
| 8,367,229 B2 | 2/2013 | Sasaki | |
| 8,379,345 B2 | 2/2013 | Mizukami et al. | |
| 8,385,017 B2 | 2/2013 | Mizukami et al. | |
| 8,460,805 B1 | 6/2013 | Gao et al. | |
| 8,530,065 B1* | 9/2013 | Chernyshov | G11B 5/65 428/829 |
| 8,630,060 B2* | 1/2014 | Mosendz | B82Y 30/00 360/97.11 |
| 8,679,654 B2* | 3/2014 | Nemoto | G11B 5/65 428/829 |
| 8,685,547 B2 | 4/2014 | Bian et al. | |
| 8,705,207 B2* | 4/2014 | Kanbe | G11B 5/65 360/135 |
| 8,889,275 B1* | 11/2014 | Yuan | G11B 5/653 428/829 |
| 9,263,075 B2* | 2/2016 | Uchida | G11B 5/65 |
| 9,324,353 B2* | 4/2016 | Hellwig | G11B 5/66 |
| 2002/0048266 A1 | 4/2002 | Choi et al. | |
| 2003/0108721 A1* | 6/2003 | Fullerton | G11B 5/66 428/195.1 |
| 2007/0020487 A1 | 1/2007 | Lim et al. | |
| 2007/0048552 A1 | 3/2007 | Soeya | |
| 2007/0292720 A1 | 12/2007 | Suess | |
| 2008/0100964 A1* | 5/2008 | Fullerton | G11B 5/64 360/135 |
| 2010/0200124 A1 | 8/2010 | Qiu et al. | |
| 2010/0214684 A1 | 8/2010 | Gao et al. | |
| 2010/0247969 A1 | 9/2010 | Hauet et al. | |
| 2011/0235205 A9 | 9/2011 | Lu et al. | |
| 2012/0113768 A1* | 5/2012 | Kanbe | G11B 5/6088 369/13.24 |
| 2012/0243397 A1 | 9/2012 | Yamamoto et al. | |
| 2013/0083426 A1 | 4/2013 | Tamaoka et al. | |
| 2013/0209835 A1* | 8/2013 | Qui | B32B 15/018 428/829 |
| 2013/0235491 A1 | 9/2013 | Mosendz et al. | |
| 2013/0314815 A1 | 11/2013 | Yuan et al. | |
| 2014/0099517 A1 | 4/2014 | Hu et al. | |
| 2014/0377590 A1* | 12/2014 | Uchida | G11B 5/65 428/829 |
| 2015/0004437 A1* | 1/2015 | Moriya | G11B 5/66 428/827 |
| 2015/0132608 A1* | 5/2015 | Kataoka | G11B 5/65 428/829 |
| 2015/0138939 A1* | 5/2015 | Hellwig | G11B 5/66 369/13.41 |
| 2015/0194175 A1* | 7/2015 | Chen | C23C 14/06 428/832 |
| 2016/0064022 A1* | 3/2016 | Thiele | G11B 5/653 428/800 |
| 2016/0099017 A1* | 4/2016 | Hellwig | G11B 5/65 369/13.11 |

OTHER PUBLICATIONS

Non-Final Office Action from U.S. Appl. No. 13/417,032, dated May 16, 2013.

Notice of Allowance from U.S. Appl. No. 13/417,032, dated Sep. 16, 2013.

Alexandrakis et al., "Hard/graded exchange spring composite media based on FePt," Journal of Applied Physics, 07B729, vol. 109, Issue 7, Mar. 29, 2011, pp. 1-3.

Dumas et al., "Graded Anisotropy FePtCu Films," IEEE Transactions on Magnetics, vol. 47, No. 6, Jun. 2011, pp. 1580-1586.

Weller, D., "FePt HAMR Recording Media—Progress and Key Requirements," IEEE Magnetics Society Santa Clara Valley Chapter Meeting Presentation Summary, Jan. 21, 2014.

Ikemoto et al., "Control of Curie Temperature of FePt(Cu) Films Prepared From Pt(Cu)/Fe Bilayers," IEEE Transactions on Magnetics, vol. 44, No. 11, Nov. 2008, pp. 3543-3546.

Ikemoto et al., "Fabrication of ultrathin FePt(Cu) ordered alloy thin films directly on glass disks from Pt(Cu)/Fe bilayers," Journal of Applied Physics, 07B512, vol. 103, Issue 7, Feb. 6, 2008, pp. 1-3.

Kryder et al., "Heat Assisted Magnetic Recording," Proceedings of the IEEE, vol. 96, No. 11, Nov. 2008, pp. 1810-1835.

Richter et al., "The Ultimate Limit of Magnetic Recording," Journal of Applied Physics, 2012, pp. 1-22.

Thiele et al., "FeRh/FePt exchange spring films for thermally assisted magnetic recording media," Applied Physics Letters, vol. 82, No. 17, Apr. 28, 2003, pp. 2859-2861.

Thiele et al., "Magnetic and Structural Properties of FePt—FeRh Exchange Spring Films for Thermally Assisted Magnetic Recording Media," IEEE Transactions on Magnetics, vol. 40, No. 4, Jul. 2004, pp. 2537-2542.

Thiele et al., "Temperature dependent magnetic properties of highly chemically ordered Fe55—xNixPt45L10 films," Journal of Applied Physics, vol. 91, No. 10, May 15, 2002, pp. 6595-6600.

Willoughby, S.D., "Electronic and magnetic properties of Fe1—xCuxPt," Journal of Applied Physics, vol. 95, No. 11, Jun. 1, 2004, pp. 6586-6588.

Zha et al., "Continuously graded anisotropy in single (Fe53Pt47)100—xCUx films," Applied Physics Letters, 182504, vol. 97, Issue 18, Nov. 3, 2010, pp. 1-3.

Mosendz et al., U.S. Appl. No. 13/417,032, filed Mar. 9, 2012.

* cited by examiner

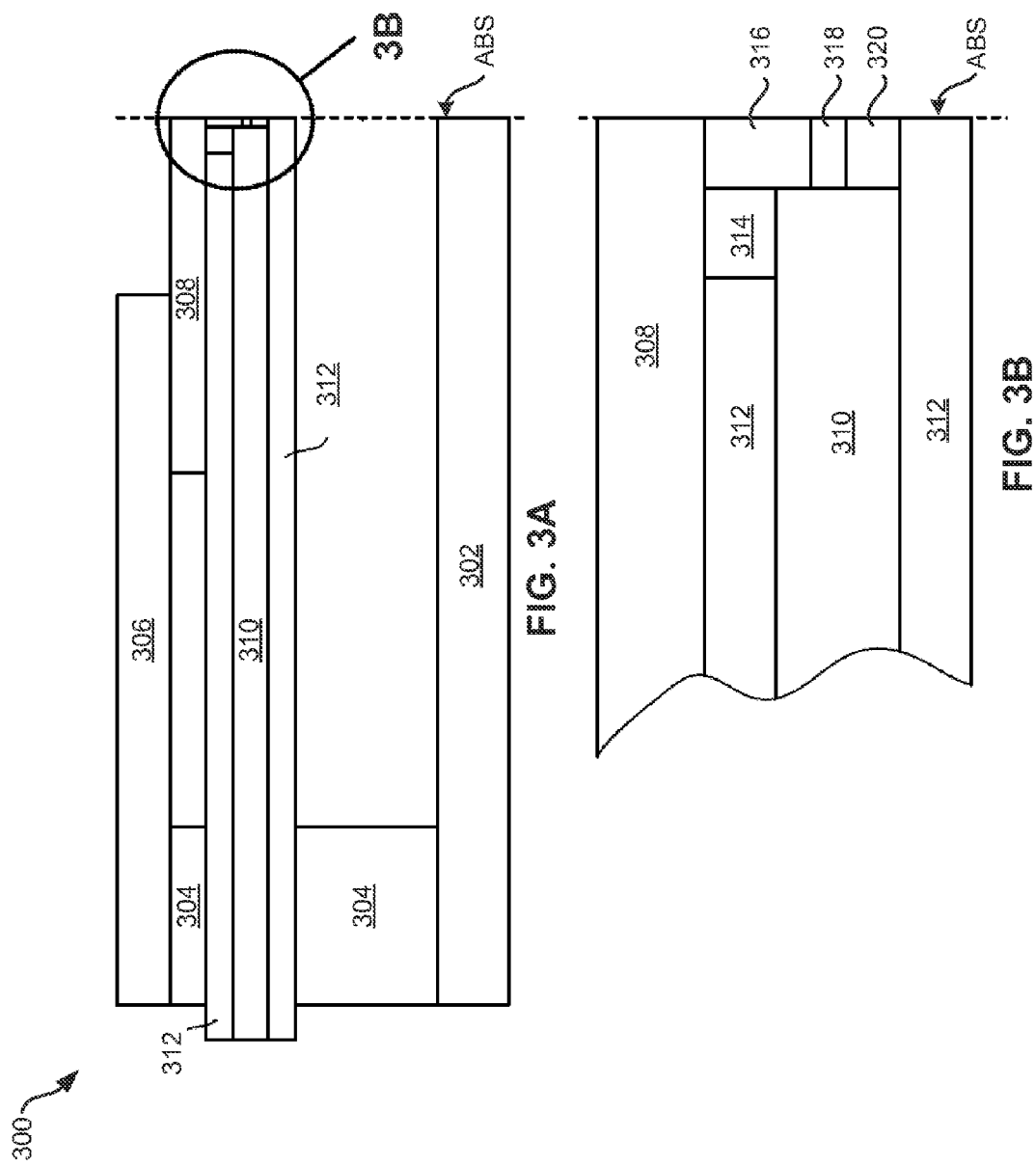

HEAT ASSISTED MAGNETIC RECORDING (HAMR) MEDIA HAVING A HIGHLY ORDERED CRYSTALLINE STRUCTURE

FIELD OF THE INVENTION

The present invention relates to data storage systems, and more particularly, this invention relates to magnetic recording media having a highly ordered crystalline structure.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent to an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

However, the further miniaturization of the various components, particularly, the size and/or pitch of magnetic grains, presents its own set of challenges and obstacles in conventional products. Noise performance and spatial resolution are key parameters in magnetic recording media and are ongoing challenges to advance the achievable areal density of media. The dominant media noise source today is transition jitter. In sputtered media, it reflects the finite size, random positioning and dispersions in size, orientation and magnetic properties of the fine grains that comprise the media.

HAMR, also referred to as thermally assisted magnetic recording, has emerged as a promising magnetic recording technique to address grain size and transition jitter. As the coercivity of the ferromagnetic recording material is temperature dependent, HAMR employs heat to lower the effective coercivity of a localized region of the magnetic media and write data therein. The data state becomes stored, or "fixed," upon cooling the magnetic media to ambient temperatures (i.e., normal operating temperatures typically in a range between about 15° C. and 60° C.). Heating the magnetic media may be accomplished by a number of techniques such as directing electromagnetic radiation (e.g. visible, infrared, ultraviolet light, etc.) onto the magnetic media surface via focused laser beams or near field optical sources. HAMR techniques may be applied to longitudinal and/or perpendicular recording systems, although the highest density storage systems are more likely to be perpendicular recording systems.

HAMR thus allows use of magnetic recording materials with substantially higher magnetic anisotropy and smaller thermally stable grains as compared to conventional magnetic recording techniques. Moreover, to further increase the areal density of magnetic recording media, granular magnetic recording materials may be utilized. Granular magnetic recording materials typically include a plurality of magnetic grains separated by one or more segregants, which aid in limiting the lateral exchange coupling between the magnetic grains. These segregants may influence magnetic properties, the size and shape of the magnetic grains, the exchange coupling strength between the magnetic grains, the grain boundary width, etc.

SUMMARY

According to one embodiment, a magnetic recording medium includes: a substrate, a seed layer positioned above the substrate, and a magnetic recording layer structure positioned above the seed layer. The magnetic recording layer structure includes: a first magnetic recording layer having a plurality of FePtCu magnetic grains and a first segregant,and a second magnetic recording layer positioned above the first magnetic recording layer, the second magnetic recording layer having a plurality of FePt magnetic grains and a second segregant, where a Curie temperature of the first magnetic recording layer is lower than a Curie temperature of the second magnetic recording layer.

According to another embodiment, a magnetic recording medium includes: a substrate, a thermal barrier layer positioned above the substrate, a seed layer positioned above the thermal barrier layer, and a magnetic recording layer structure positioned directly above and on the seed layer. The magnetic recording layer structure includes: a first magnetic recording layer having a plurality of $L1_0$FePt—X magnetic grains and a first segregant, X being selected from a group consisting of: Ag, Cu, Au, Ni, Mn, and combinations thereof, and a second magnetic recording layer positioned above the first magnetic recording layer, the second magnetic recording layer having a plurality of $L1_0$FePt magnetic grains and a second segregant, where a Curie temperature of the first magnetic recording layer is lower than a Curie temperature of the second magnetic recording layer, and where an amount of X in the FePt—X magnetic grains in the first magnetic recording layer is between about 5 at % and 20 at %.

Any of these embodiments may be implemented in a magnetic data storage system such as a disk drive system, which in v include a magnetic head, a drive mechanism for passing a magnetic medium (e,g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of a perpendicular magnetic head with looped coils, according to one embodiment.

FIG. 3B is a cross-sectional view of a piggyback magnetic head with looped coils, according to one embodiment.

DETAILED DESCRIPTION

Figure 1:
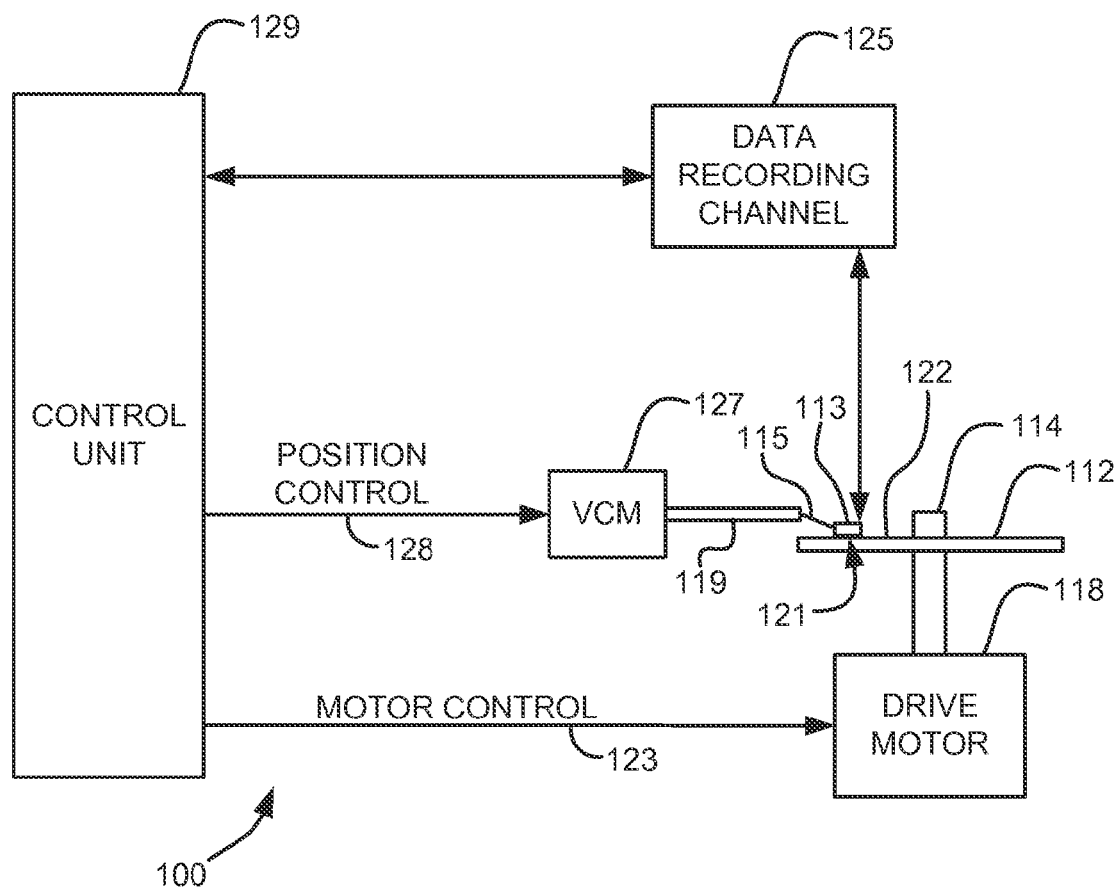
FIG. 1 is a simplified drawing of a magnetic recording disk drive system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic recording storage systems and/or related systems and methods, as well as operation and/or component parts thereof. For example, various embodiments disclosed herein are directed to magnetic recording multilayer structures having two FePt magnetic recording layers, where at least the lowermost magnetic recording layer (i.e., the magnetic recording layer farthest from the film's upper surface) comprises one or more alloying elements (e.g., Cu, Ag, Au, Ni, Mn, etc.) to reduce the Curie temperature of said layer and/or to improve crystalline orientation of said layer and the magnetic recording layer deposited thereabove. In additional approaches, the magnetic recording multilayer structures disclosed herein may include at least three FePt magnetic layers, where the middle magnetic recording layer does not includes any of the aforementioned alloying elements in the magnetic grains thereof, in contrast to the uppermost and lowermost FePt magnetic recording layers which may include one or more of said alloying elements. It has been surprisingly and unexpectedly found that incorporating Cu throughout the entirety of the magnetic recording multilayer structures disclosed herein, or throughout only a portion thereof, improves the crystalline orientation, the DC signal-to-noise (SNR) performance and the magnetic properties of FePt-based media.

In one general embodiment, a magnetic recording medium includes: a substrate, a seed layer positioned above the substrate, and a magnetic recording layer structure positioned above the seed layer. The magnetic recording layer structure includes: a first magnetic recording layer having a plurality of FePtCu magnetic grains and a first segregant, and a second magnetic recording layer positioned above the first magnetic recording layer, the second magnetic recording layer having a plurality of FePt magnetic grains and a second segregant, where a Curie temperature of the first magnetic recording layer is lower than a Curie temperature of the second magnetic recording layer.

In another general embodiment, a magnetic recording medium includes: a substrate, a thermal barrier layer positioned above the substrate, a seed layer positioned above the thermal barrier layer, and a magnetic recording layer structure positioned directly above and on the seed layer. The magnetic recording layer structure includes: a first magnetic recording layer having a plurality of $L1_0$ FePt—X magnetic grains and a first segregant, X being selected from a group consisting of: Ag, Cu, Au, Ni, Mn, and combinations thereof, and a second magnetic recording layer positioned above the first magnetic recording layer, the second magnetic recording layer having a plurality of $L1_0$ FePt magnetic grains and a second segregant, where a Curie temperature of the first magnetic recording layer is lower than a Curie temperature of the second magnetic recording layer, and where an amount of X in the FePt—X magnetic grains in the first magnetic recording layer is between about 5 at % and 20 at. %.

Referring now to FIG. 1, a disk drive 100 is shown in accordance with one embodiment. As an option, the disk drive 100 may be implemented in conjunction with features from any other embodiment listed herein, such as those described with reference to the other Figures. Of course, the disk drive 100 and others presented herein may be used in various applications and/or in permutations which may or may not be specifically described in the illustrative embodiments listed herein.

As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 13 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control a s system operations such as drive motor control signals on line 123 and head position and seek control signals on line 128. The control signals on line 128 provide the desired current profiles to optimally move and position slider 113 to the desired data rack on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
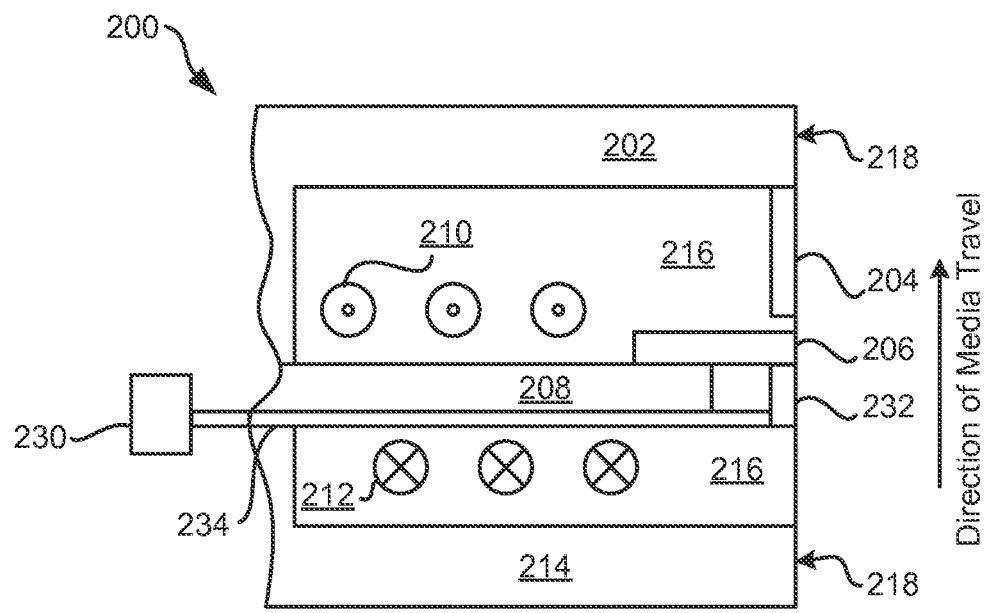
FIG. 2A is a cross-sectional view of a perpendicular magnetic head with helical coils, according to one embodiment.
Figure 2B:
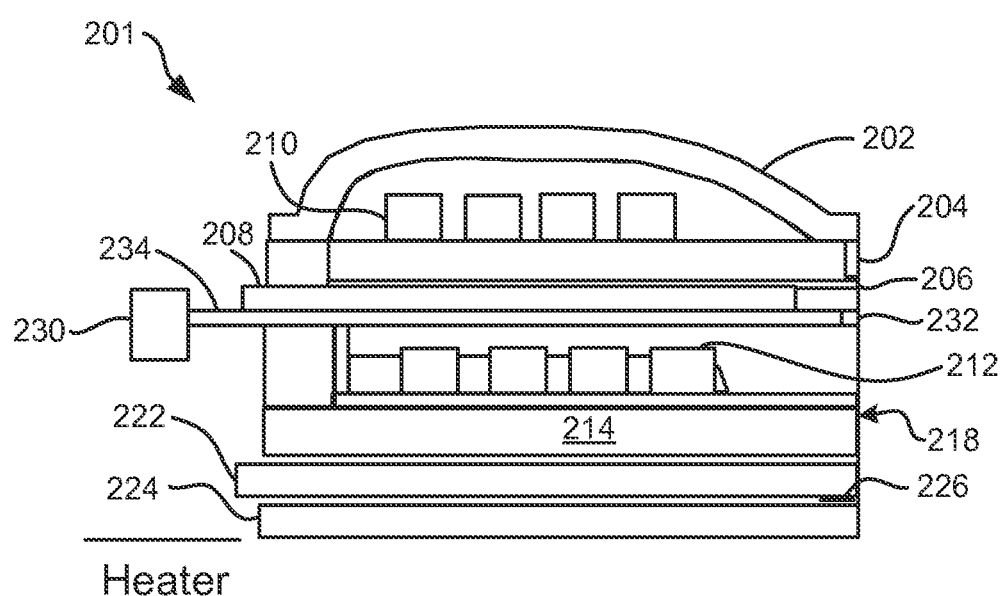
FIG. 2B is a cross-sectional view of a piggyback magnetic head with helical coils, according to one embodiment.

FIGS. 2A and 2B provide cross-sectional views of a magnetic head 200 and a piggyback magnetic head 201, according to various embodiments. As an option, the magnetic heads 200, 201 may be implemented in conjunction with features from any other embodiment listed herein, such as those described with reference to the other Figures. Of course, the magnetic heads 200, 201 and others presented herein may be used in various applications and/or in permutations which may or may not be specifically described in the illustrative embodiments listed herein.

As shown in the magnetic head 200 of FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

In various optional approaches, the magnetic head 200 may be configured for HAMR. Accordingly, for HAMR operation, the magnetic head 200 may include a heating mechanism of any known type to heat the magnetic medium (not shown). For instance, as shown in FIG. 2A according to one in one particular approach, the magnetic head 200 may include a light source 230 (e.g., a laser) that illuminates a near field transducer 232 of known type via a waveguide 234.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

An optional heater is shown in FIG. 2B near the non-ABS side of the piggyback magnetic head 201. A heater (Heater) may also he included in the magnetic head 200 of FIG. 2A. The position of this heater may vary based on design parameters such as where the protrusion is desired, coefficients of thermal expansion of the surrounding layers, etc.

Moreover, in various optional approaches, the piggyback magnetic head 201 may also be configured for heat assisted magnetic recording (HAMR). Thus, for HAMR operation, the magnetic head 200 may additionally include a light source 230 (e.g., a laser) that illuminates a near field transducer 232 of known type via a waveguide 234.

Referring now to FIG. 3A, a partial cross section view of a system 300 having a thin film perpendicular write head design incorporating an integrated aperture near field optical source (e.g., for HAMR operation) is shown according to one embodiment. As an option, this system 300 may be implemented in conjunction with features from any other embodiment listed herein, such as those described with reference to the other Figures. Of course, such a system 300 and others presented herein may be used in various applications and/or in permutations which may or may not be specifically described in the illustrative embodiments listed herein. Moreover, in order to simplify and clarify the general structure and configuration of the system 300, spacing layers, insulating layers, and write coil layers may be omitted from FIG. 3.

As shown in FIG. 3A, the write head has a lower return pole layer 302, back-gap layer(s) 304, upper return pole layer 306, and upper pole tip layer 308. In one approach, the lower return pole layer 302 may also have a lower pole tip (not shown) at the ABS. Layer 310 is an optical waveguide core, which may be used while conducting HAMR, e.g., to guide light from a light source to heat a medium (not shown) at the ABS when the system 300 is writing thereto. According to a preferred approach, the optical waveguide core is surrounded by cladding layers 312. Moreover, layers 310 and 312 may extend through at least a portion of back-gap layer(s) 304. The components inside of Circle 3B are shown in an expanded view in FIG. 3B, as discussed in further detail below.

Layer 310 may be comprised of a suitable light transmitting material, as would be known by one of reasonable skill in the relevant art. Exemplary materials include $Ta_2O_5$, and/or $TiO_2$. As shown, the core layer 310 has approximately uniform cross section along its length. As well known in the art, the optical waveguide can have a number of other possible designs including a planar solid immersion mirror or planar solid immersion lens which have a non-uniform core cross section along the waveguide's length.

In various approaches, coil layers (not shown) and various insulating and spacer layers (not shown) might reside in the cavity bounded by the ABS, back-gap(s) 304, lower return pole 302, and/or upper bounding layers 306, 308, and 312 as would be recognized by those of skill in the art. Layers 302, 304, 306, and 308 may be comprised of a suitable magnetic alloy or material, as would be known by one of reasonable skill in the relevant art. Exemplary materials include Co, Fe, Ni, Cr and combinations thereof.

As described above, FIG. 3B is a partial cross section expanded view of detail 3B in FIG. 3A, in accordance with one embodiment. Pole lip 316 is magnetically coupled to upper pole tip layer 308, and to optional magnetic step layer 314. Aperture 318 (also known as a ridge aperture), surrounding metal layer 320, and pole lip 316 comprise the near field aperture optical source (or near field transducer), which is supplied optical energy via optical waveguide core 310. Pole lip 316 and optional magnetic step layer 314 may be comprised of a suitable magnetic alloy, such as Co, Fe, Ni, Cr and/or combinations thereof. Metal layer 320 may be comprised of Cu, Au, Ag, and/or alloys thereof, etc.

With continued reference to FIG. 3B, cladding layer 312 thickness may be nominally about 300 nm, but may be thicker or thinner depending on the dimensions of other layers in the structure. Optional magnetic step layer 314 may have a nominal thickness (the dimension between layers 308 and 310) of about 300 nm, and a nominal depth (as measured from layer 316 to layer 312) of about 180 nm. Pole lip 316 may have a nominal depth (as measured from the ABS) approximately equal to that of layer 320, with the value being determined by the performance and properties of the near field optical source (see examples below). The thickness of the pole lip 316 can vary from about 150 nm (with the optional magnetic step layer 314) to about 1 micron, preferably between about 250 nm and about 350 nm. The thickness of optical waveguide core layer 310 may be nominally between about 200 nm and about 400 nm, sufficient to cover the thickness of the aperture 318. In the structure shown in FIG. 3B, the layer 308 extends to the ABS. In some preferred embodiments, the layer 308 may be recessed from the ABS while maintaining magnetic coupling with the layers 314 and 316.

Figure 4A:
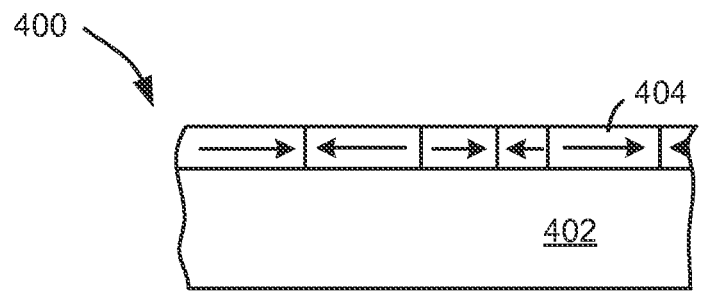
FIG. 4A is a schematic representation of a section of a longitudinal recording medium, according to one embodiment.

FIG. 4A provides a schematic illustration of a longitudinal recording medium 400 typically used with magnetic disc recording systems, such as that shown in FIG. 1. This longitudinal recording medium 400 is utilized for recording magnetic impulses in (or parallel to) the plane of the medium itself. This longitudinal recording medium 400, which may be a recording disc in various approaches, comprises at least a supporting substrate 402 of a suitable non-magnetic material such as glass, and a magnetic recording layer 404 positioned above the substrate.

Figure 4B:
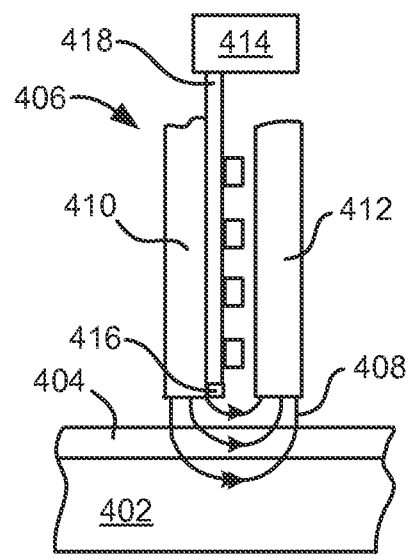
FIG. 4B is a schematic representation of a magnetic recording head and the longitudinal recording medium of FIG. 4A, according to one embodiment.

FIG. 4B shows the operative relationship between a recording/playback head 406, which may preferably be a thin film head and/or other suitable head as would be recognized by one having skill in the art upon reading the present disclosure, and the longitudinal recording medium 400 of FIG. 4A. As shown in FIG. 4B, the magnetic flux 408, which extends between the main pole 410 and return pole 412 of the recording/playback head 406, loops into and out of the magnetic recording layer 404.

In various optional approaches, the recording/playback head 406 may additionally be configured for heat assisted magnetic recording (HAMR). Accordingly, for HAMR operation, the recording/playback head 406 may include a heating mechanism of any known type to heat, and thus lower the effective coercivity, of a localized region on the magnetic medium 400 surface in the vicinity of the main pole 410. For instance, as shown in FIG. 48, a light source 414 such as a laser illuminates a near field transducer 416 of known type via a waveguide 418.

Figure 5A:
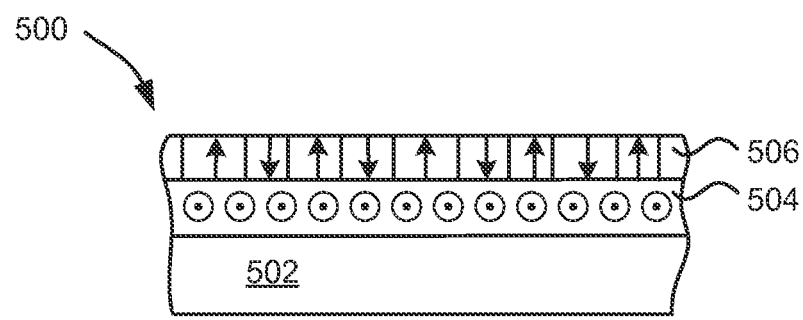
FIG. 5A is a schematic representation of a perpendicular recording medium, according to one embodiment.

Improvements in longitudinal recording media have been limited due to issues associated with thermal stability and recording field strength. Accordingly, pursuant to the current push to increase the areal recording density of recording media, perpendicular recording media (PMR) has been developed and found to be superior to longitudinal recording media. FIG. 5A provides a schematic diagram of a simplified perpendicular recording medium 500, which may also be used with magnetic disc recording systems, such as that shown in FIG. 1. As shown in FIG. 5A, the perpendicular recording medium 500, which may be a recording disc in various approaches, comprises at least a supporting substrate 502 of a suitable non-magnetic material (e.g., glass, aluminum, etc.), and a soft magnetic underlayer 504 of a material having a high magnetic permeability positioned above the substrate 502. The perpendicular recording medium 500 also includes a magnetic recording layer 506 positioned above the soft magnetic underlayer 504, where the magnetic recording layer 506 preferably has a high coercivity relative to the soft magnetic underlayer 504. There may be several additional layers present, such as an "exchange-break" layer or "interlayer" (not shown) between the soft magnetic underlayer 504 and the magnetic recording layer 506.

The orientation of magnetic impulses in the magnetic recording layer 506 is substantially perpendicular to the surface of the recording layer. The magnetization of the soft magnetic underlayer 504 is oriented in (or parallel to) the plane of the soft magnetic underlayer 504. As particularly shown in FIG. 5A, the in-plane magnetization of the soft magnetic underlayer 504 may be represented by an arrow extending into the paper.

Figure 5B:
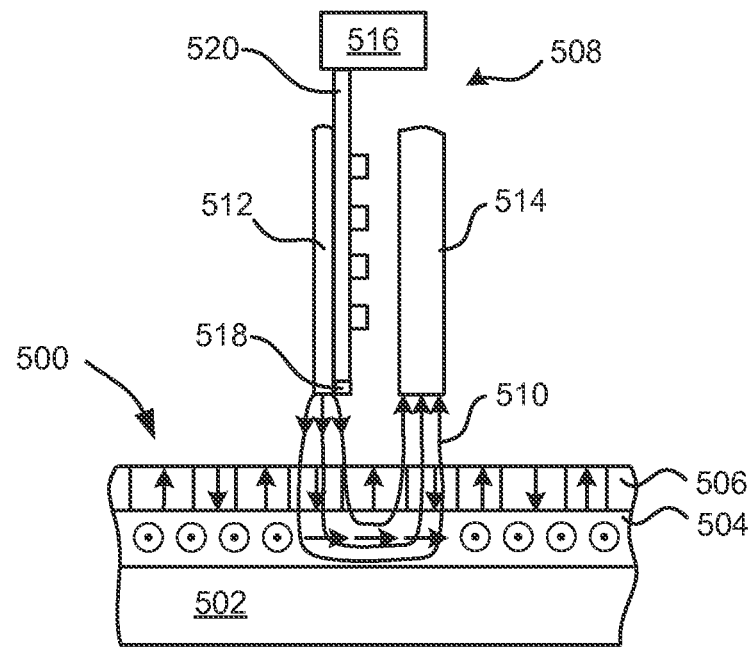
FIG. 5B is a schematic representation of a recording head and the perpendicular recording medium of FIG. 5A, according to one embodiment.

FIG. 5B illustrates the operative relationship between a perpendicular head 508 and the perpendicular recording medium 500 of in FIG. 5A. As shown in FIG. 5B, the magnetic flux 510, which extends between the main pole 512 and return pole 514 of the perpendicular head 508, loops into and out of the magnetic recording layer 506 and soft magnetic underlayer 504. The soft magnetic underlayer 504 helps focus the magnetic flux 510 from the perpendicular head 508 into the magnetic recording layer 506 in a direction generally perpendicular to the surface of the magnetic medium 500. Accordingly, the intense magnetic field generated between the perpendicular head 508 and the soft magnetic underlayer 504, enables information to be recorded in the magnetic recording layer 506. The magnetic flux is further channeled by the soft magnetic underlayer 504 back to the return pole 514 of the head 508.

As noted above, the magnetization of the soft magnetic underlayer 504 is oriented in (parallel to) the plane of the soft magnetic underlayer 504, and may represented by an arrow extending into the paper. However, as shown in FIG. 5B, this in-plane magnetization of the soft magnetic underlayer 504 may rotate in regions that are exposed to the magnetic flux 510.

It should be again noted that in various approaches, the perpendicular head 508 may be configured for heat assisted magnetic recording (HAMR). Accordingly, for HAMR operation, the perpendicular head 508 may include a heating mechanism of any known type to heat, and thus lower the effective coercivity of, a localized region on the magnetic media surface in the vicinity of the main pole 518. For instance, as shown in FIG. 5B, a light source 516 such as a laser illuminates a near field transducer 518 of known type via a waveguide 520.

Except as otherwise described herein with reference to the various inventive embodiments, the various components of the structures of FIGS. 1-5B, and of other embodiments described herein, may be of conventional materials and design, and fabricated using conventional techniques, as would become apparent to one skilled in the art upon reading the present disclosure.

As discussed previously, HAMR allows magnetic recording technology to use materials with substantially larger magnetic anisotropy (e.g., small thermally stable grains are possible) and coercive field by localized heating of the magnetic layer above its Curie temperature, where anisotropy is reduced. One example of a magnetic recording material having a particularly high magnetic anisotropic constant, and thus particularly suitable for HAMR purposes, is a chemically ordered $L1_0$FePt alloy. Chemical ordering in a FePt alloy is achieved by deposition thereof at elevated temperatures (about 450 to about 700° C.), which results in formation of the face-centered tetragonal (fct) $L1_0$FePt phase rather than the face centered cubic (fcc) Al phase. A chemically-ordered $L1_0$FePt alloy thus has atomic layers of Fe and Pt alternating along the [001] direction.

Figure 6:
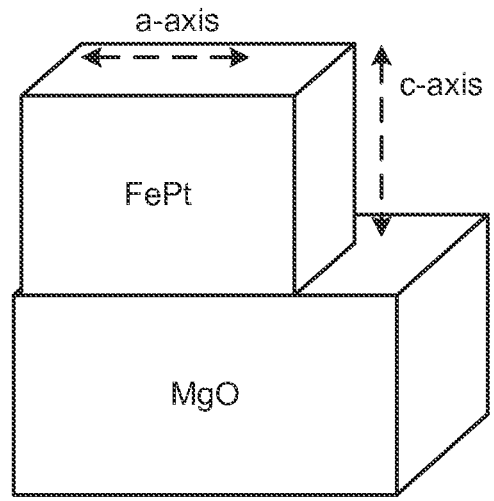
FIG. 6 is a simplified representation of FePt and MgO crystallographic unit cells and the lattice mismatch therebetween.

In various embodiments, a granular $L1_0$FePt thin film may be deposited at elevated temperatures on one or more seed layers configured to facilitate FePt crystal growth. In one particular approach, the seed layer positioned directly beneath the $L1_0$FePt film may include an MgO (001) surface. In such an approach, the larger lattice parameter of MgO stretches the a-axis of FePt, causing induced stress at the FePt/MgO interface, which in combination with the tetragonal structure of $L1_0$FePt, results in a desired configuration with the hard magnetic a-axis oriented in the in-plane direction and the easy magnetic c-axis oriented in the out of plane direction, as shown in FIG. 6.

However, X-ray diffraction (XRD) scans reveal that an MgO seed layer positioned directly below a granular $L1_0$FePt thin film may be insufficient to orient all the magnetic grains therein in the correct direction. For instance, XRD scans reveal that about 90% of the $L1_0$FePt magnetic grains may be oriented correctly with the c-axis being oriented out of plane of the film due to the tetragonal lattice structure of the FePt, and the a-axis mismatch with the MgO seed layer being about 3.5% less than the c-axis mismatch with the MgO seed layer. Unfortunately, the XRD in-plane scans also revealed the misorientation of the remaining $L1_0$FePt magnetic grains having the easy magnetic c-axis oriented in the in-plane direction, which manifests itself as about 10% remanence hard axis magnetic measurements. Spin stand measurements confirm that such crystallographic defects, e.g., the misoriented $L1_0$FePt magnetic grains, ultimately result in a substantial increase in DC media noise. In particular, a $L1_0$FePt film having about 10% of its magnetic grains with the easy magnetic c-axis oriented in the in-plane direction may exhibit about 10-12 dB of additional DC noise compared to a defect-free film.

In some embodiments, modification of the one or more seed layers positioned below the $L1_0$FePt film may be made to improve the c-axis orientation of the $L1_0$FePt magnetic grains. For example, in one approach, the aforementioned MgO seed layer(s) may be substituted with TiN seed layer(s) or other suitable seed layers known in the art. While, XRD measurements show some improvement in the c-axis orientation of the $L1_0$FePt magnetic grains by modifying the chemical composition of these one or more of the seed layers, the magnetic properties of the $L1_0$FePt film showed an unwanted increase in the amount of coupling and a reduction in anisotropy. Moreover, the microstructure of the $L1_0$FePt film was adversely affected due to grain merging and the formation of a more pronounced second layer of grain formation.

Accordingly, various embodiments disclosed herein overcome the aforementioned drawbacks by introducing one or more additional alloying elements into the $L1_0$FePt magnetic grains to modify the lattice parameter and improve the c-axis orientation thereof. In some approaches, at least one magnetic recording layer comprises $L1_0$FePtX with one or more segregant materials positioned therebetween, where X may be selected from a group consisting of: Ag, Cu, Au, Ni, Mn, and combinations thereof. In such approaches, the a-axis lattice parameter of the ternary $L1_0$FePtX alloy may be better matched to the a-axis lattice parameter of a seed layer positioned directly below, which may improve the desired out of plane (i.e., perpendicular to film plane) crystal orientation of the FePtX easy magnetic axis. In various approaches where a magnetic medium comprises a single magnetic recording layer, improvement in the c-axis orientation of the magnetic grains may be achieved by alloying X throughout the entire magnetic recording layer or specific portions thereof. Moreover, in other approaches where a magnetic medium comprises a magnetic recording layer structure with at least two magnetic recording layers, improvement in the c-axis orientation of the magnetic grains may be achieved by alloying X throughout the entire magnetic recording layer structure or select magnetic recording layers therein. The improved crystal structure of the $L1_0$FePtX magnetic grains reduces media noise while maintaining good transition noise, thus improving overall magnetic media performance.

Figure 7:
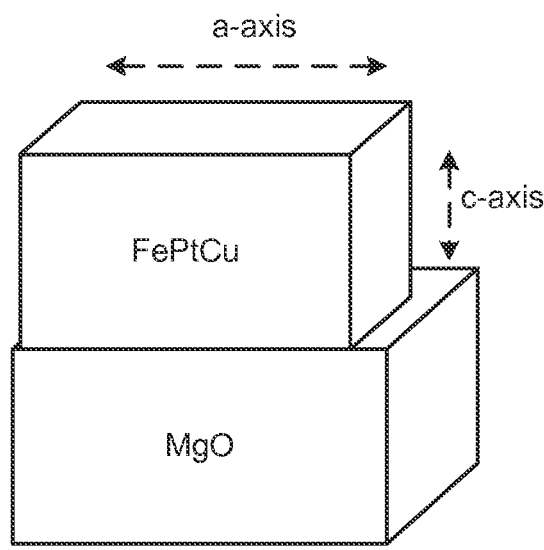
FIG. 7 is a simplified representation of FePtCu and MgO crystallogrpahic unit cells and the lattice mismatch therebetween.
Figure 8A:
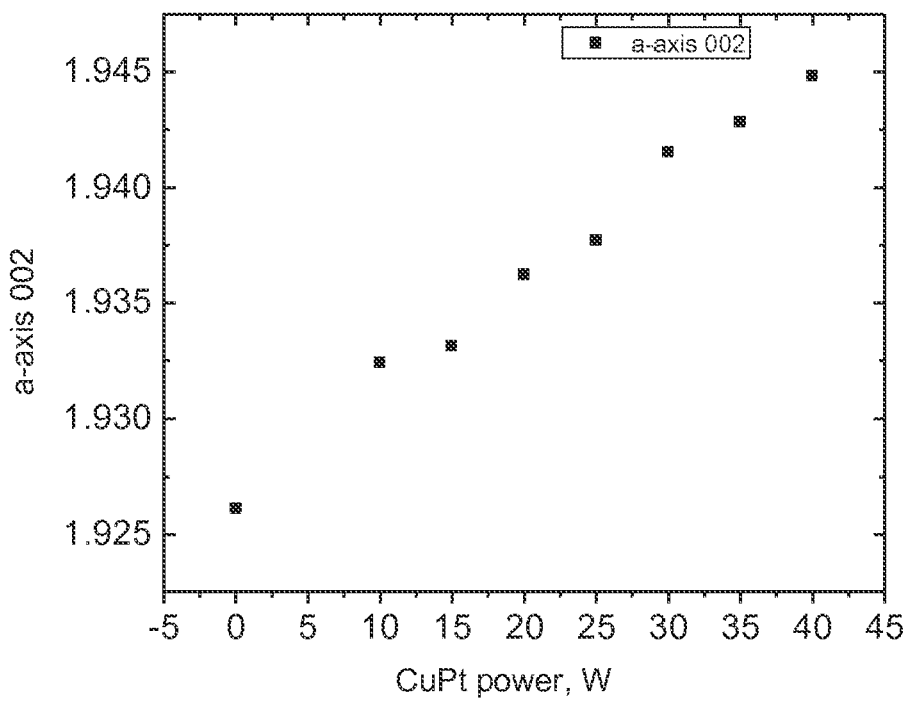
FIG. 8A is a plot illustrating the change in a-axis lattice parameter of $L1_0$FePtCu magnetic grains as a function of Cu content.
Figure 8B:
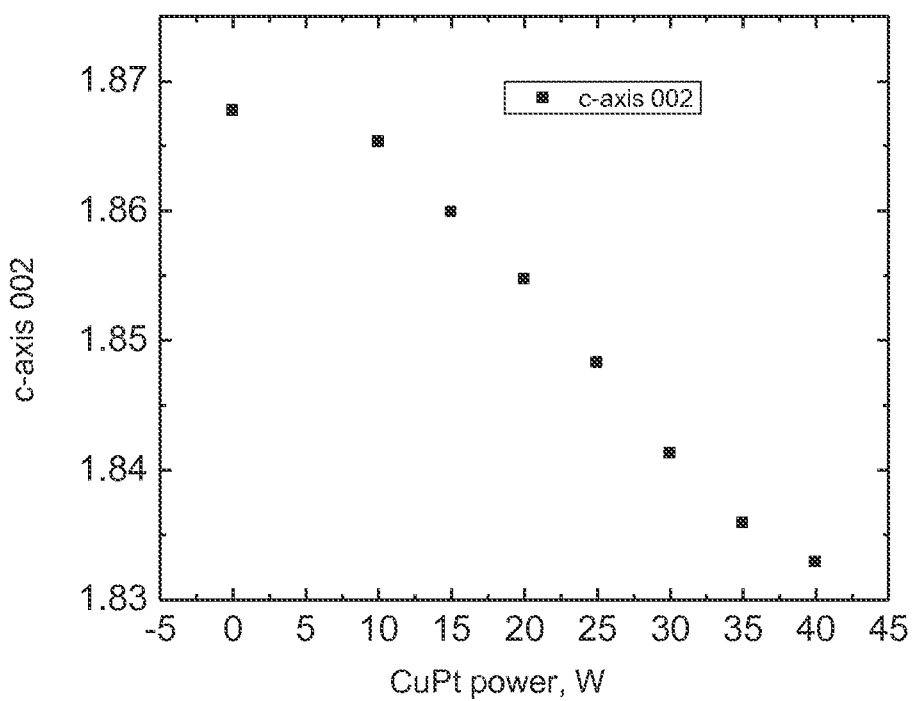
FIG. 8B is a plot illustrating the change in the c-axis lattice parameter of $L1_0$FePtCu magnetic grains as a function of Cu content.
Figure 9A:
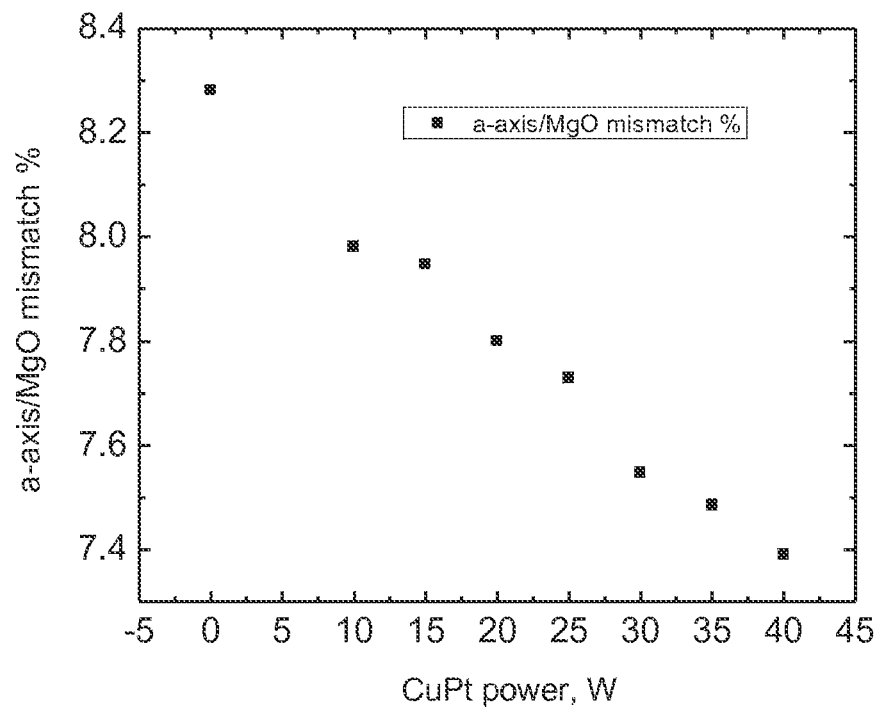
FIG. 9A is a plot illustrating the a-axis mismatch $L1_0$FePtCu magnetic grains with a MgO seed layer as a function of Cu content.
Figure 9B:
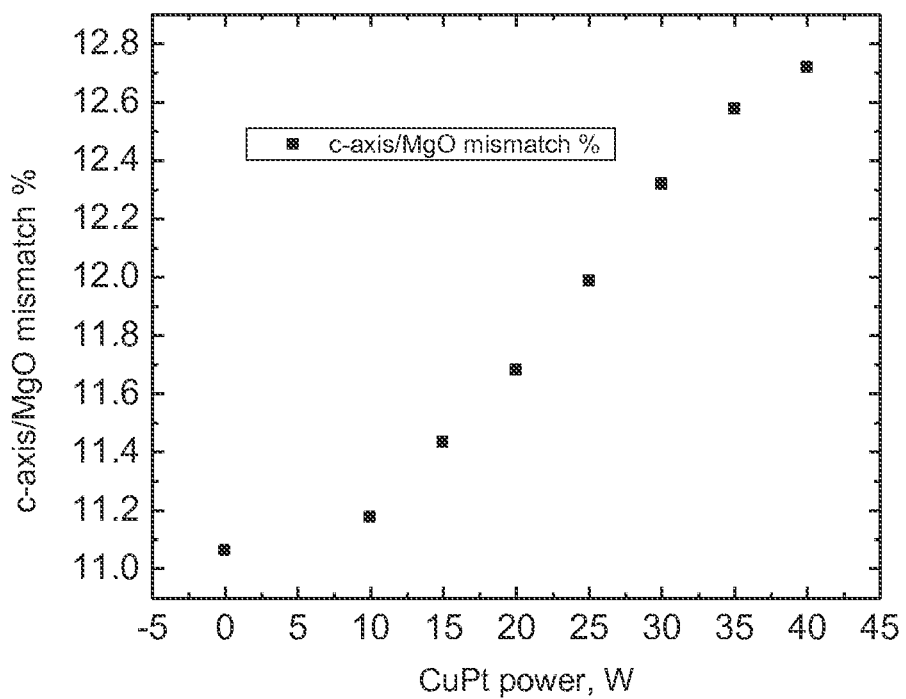
FIG. 9B is a plot illustrating the change in the c-axis mismatch of $L1_0$FePtCu magnetic grains with a MgO seed layer as a function of Cu content.

In one preferred approach, a magnetic recording layer may be deposited directly on an upper surface of an MgO seed layer, where the magnetic recording layer includes $L1_0$FePtCu magnetic grains and, preferably, one or more segregant materials positioned therebetween. A simplified illustration of crystal growth of a $L1_0$FePtCu crystallographic unit cell on an MgO crystallographic unit cell is shown in FIG. 7. Introduction of the Cu dopant into $L1_0$FePt magnetic grains changes the a-axis and c-axis lattice parameters thereof in a desired direction and improves the a-axis and c-axis mismatch of the magnetic grains with the MgO seed layer. For instance, FIGS. 8A and 8B illustrate the change in the a-axis lattice parameter and the c-axis parameter, respectively, of the $L1_0$FePtCu magnetic grains as a function of CuPt power in Watts, which directly corresponds to the amount of Cu in the FePtCu magnetic grains. Additionally, FIGS. 9A and 9B illustrate the change in the a-axis mismatch and the c-axis mismatch, respectively, of the FePtCu magnetic grains with the MgO seed layer as a function of CuPt power. The correspondence between CuPt power and the atomic percentage of Cu in the FePtCu magnetic grains is provided in Table 1 below.

TABLE 1

| CuPt power (W) | at. % of Cu |
| --- | --- |
| 40 | 20.83 |
| 35 | 17.34 |
| 30 | 16.51 |
| 25 | 14.41 |
| 20 | 11.44 |
| 15 | 10.85 |
| 10 | 7.18 |

With regard to Table 1, it is important to note that the amount of Cu varies relative to the amount of Fe, whereas the amount of Pt is preferably fixed at about 50 at. %. For example, the relative amounts of Fe, Cu and Pt in the FePtCu magnetic grains may be expressed as: Fe(50-n at. %)Cu(n at. %)Pt(50 at. %).

Figure 10:
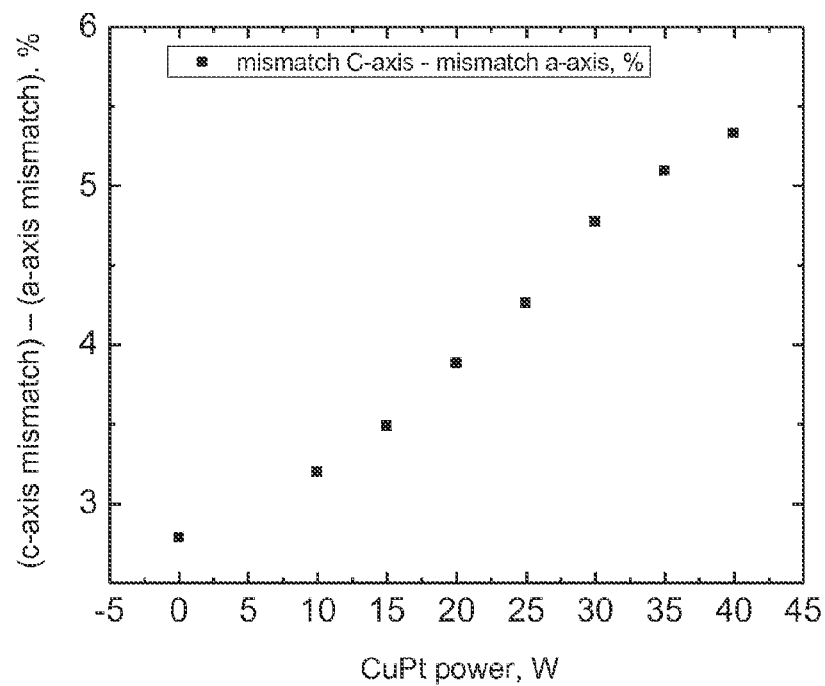
FIG. 10 is a plot illustrating the difference between the a-axis mismatch and the c-axis mismatch of $L1_0$FePtCu magnetic grains with an MgO seed layer as a function of Cu content.

FIG. 10 illustrates the difference in the a-axis mismatch and the c-axis mismatch (y axis values=[c-axis axis mismatch]−[a-axis mismatch]) of the FePtCu magnetic grains with the MgO seed layer as a function of CuPt power (i.e., varying Cu content in the magnetic grains). As clearly evident in FIG. 10, the difference in the a-axis and c-axis mismatch increased with increasing Cu amount. This increased difference between the a-axis mismatch and the c-axis mismatch not only reduces the DC media noise but also improves the magnetic properties of the media, such as a decrease in the remanent magnetic moment by about a factor of 2.

Figure 11:
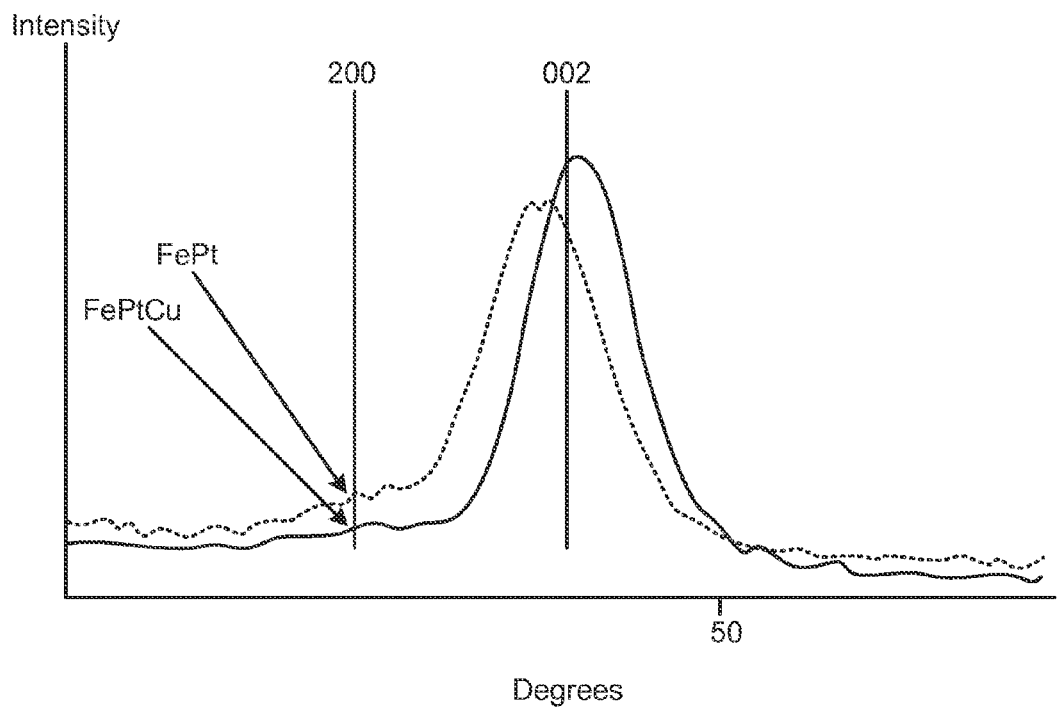
FIG. 11 are X-ray diffraction scans of $L1_0$FePtCu magnetic grains and $L1_0$FePt magnetic grains.

Comparison of FePt magnetic grains and FePtCu magnetic grains using XRD measurements also reveal that incorporation of the Cu alloying element into the magnetic grains improves the desired out-of-plane orientation of the easy magnetic axis. For example, as shown in the XRD scans in FIG. 11, there is a significant reduction in the c-axis in-plane variant for FePtCu magnetic grains versus FePt magnetic grains.

Figure 12:
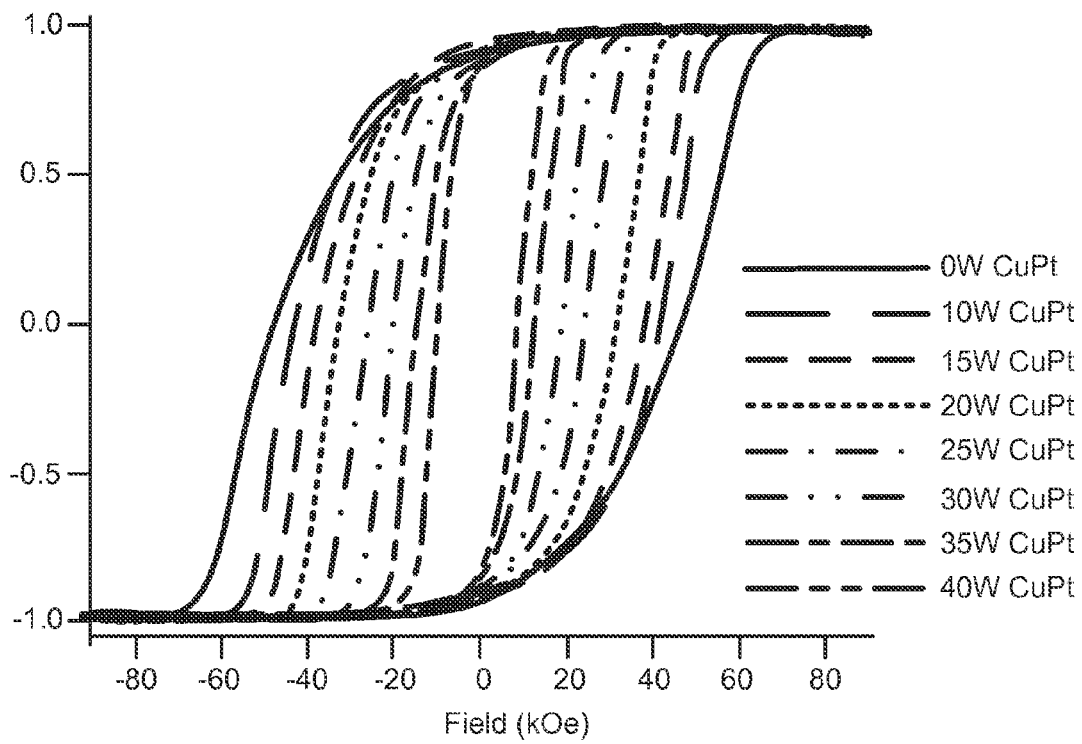
FIG. 12 illustrates easy axis hysteresis loops for various $L1_0$FePtCu magnetic recording layers, each of which have a different Cu content/amount.
Figure 13:
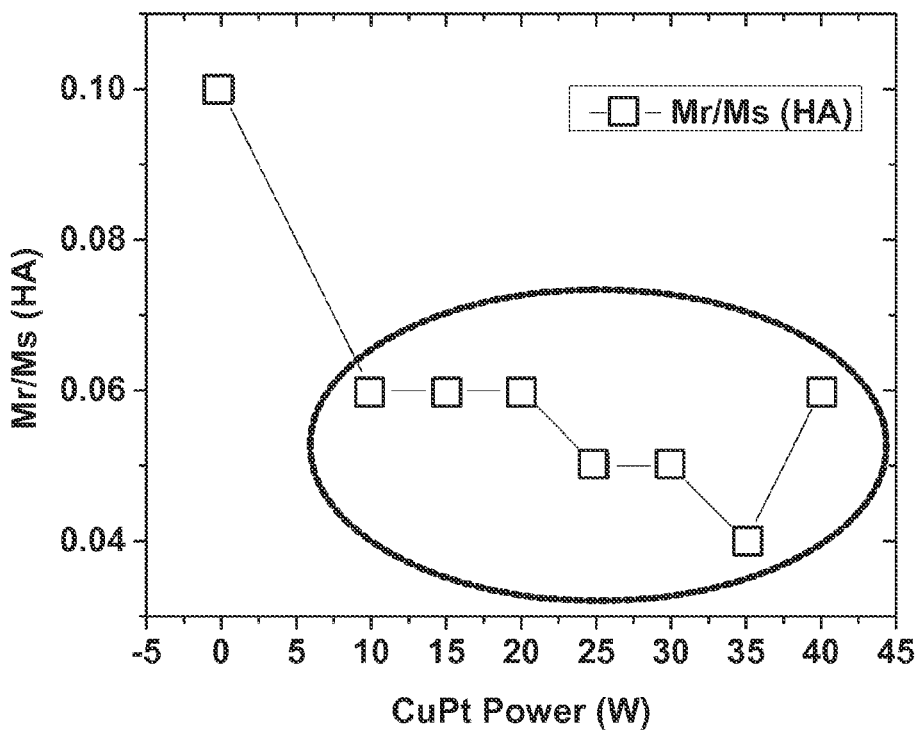
FIG. 13 is a plot of the remanent magnetization along the hard axis for a $L1_0$FePtCu magnetic recording layer as function of Cu content.
Figure 14:
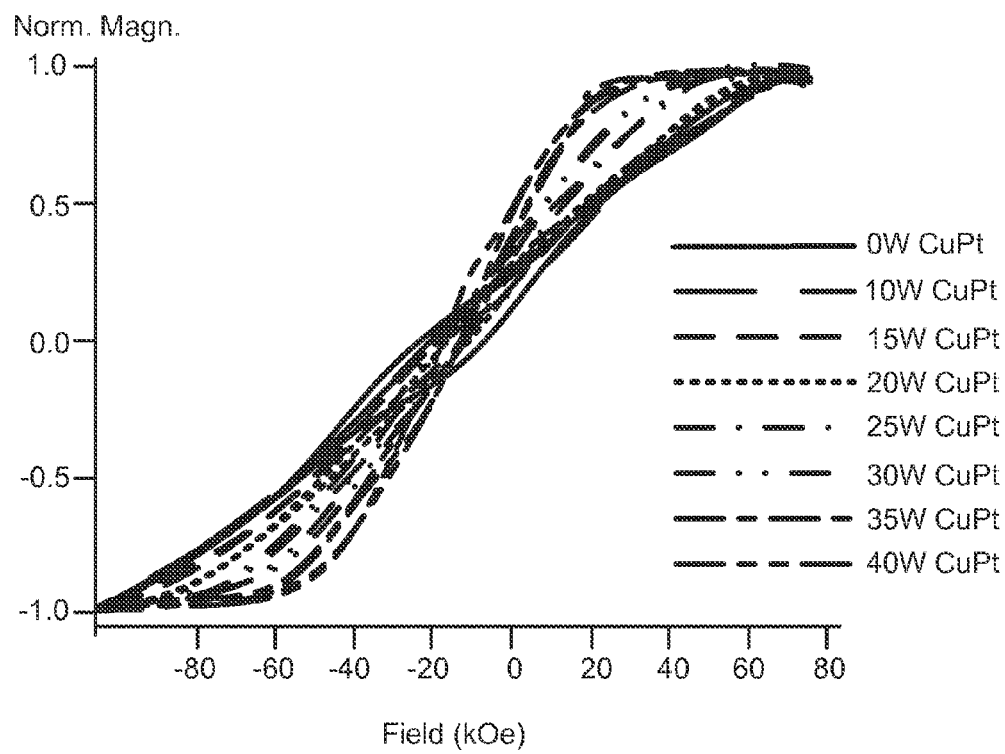
FIG. 14 illustrates hard axis hysteresis loops for various $L1_0$FePtCu magnetic recording layers, each of which have a different Cu content/amount.
Figure 15:
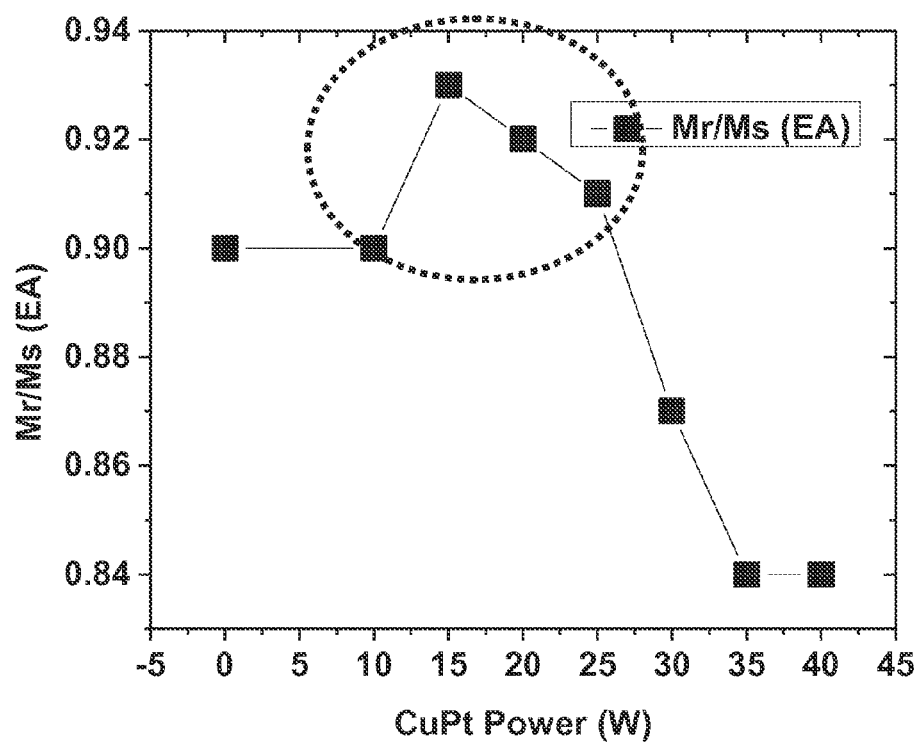
FIG. 15 is a plot of the remanent magnetization along the easy axis for a $L1_0$FePtCu magnetic recording layer as function of Cu content

FIGS. 12-19 illustrate the surprising and unexpected improvement in the magnetic properties associated with a magnetic recording layer including $L1_0$FePtCu magnetic grains therein. For instance, FIG. 12 illustrates various easy axis hysteresis loops of $L1_0$FePtCu magnetic recording layers having different Cu contents/amounts, and FIG. 13 provides a plot of the hard axis remanent magnetization of a $L1_0$FePtCu magnetic recording layer as function of Cu content. Increasing the Cu content in the magnetic grains reduces and/or eliminates grains having undesired, in-plane magnetization orientations, thus reducing the remanent magnetization along the hard axis. Improvement in the remanent magnetization along the easy axis is evident in FIG. 14, which illustrates various hard axis hysteresis loops of $L1_0$FePtCu magnetic recording layers having varying Cu contents/amounts, and FIG. 15, which provides a plot of the easy axis remanent magnetization a $L1_0$FePtCu magnetic recording layer as function of Cu content. Such improvement in the remanent magnetization along the easy axis is yet another indication of improved alignment of the magnetic grains along the c-axis.

Figure 16:
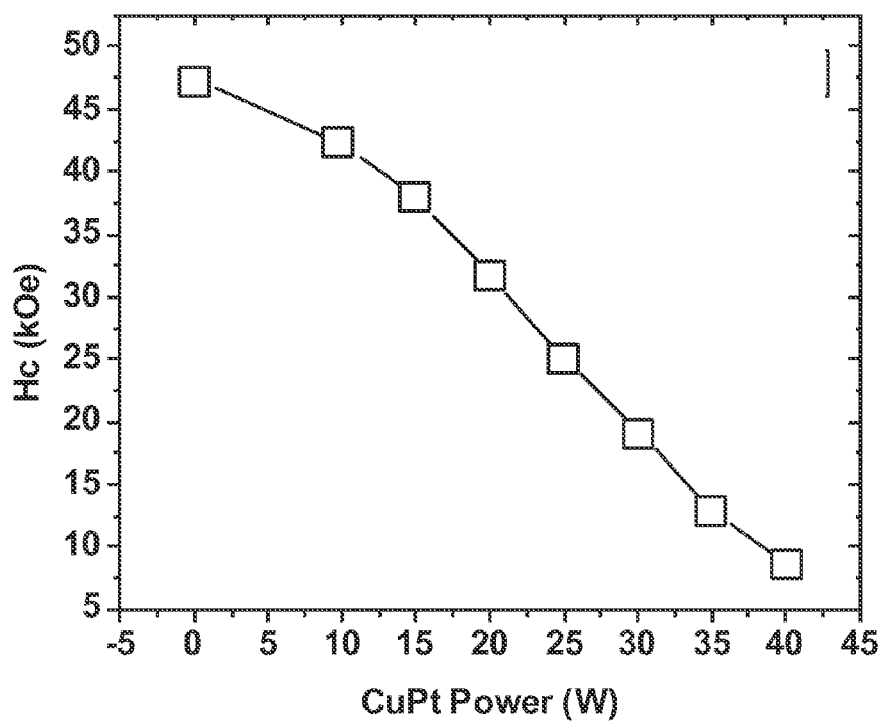
FIG. 16 is a plot of the coercivity of a $L1_0$FePtCu magnetic recording layer as a function of Cu content.
Figure 17:
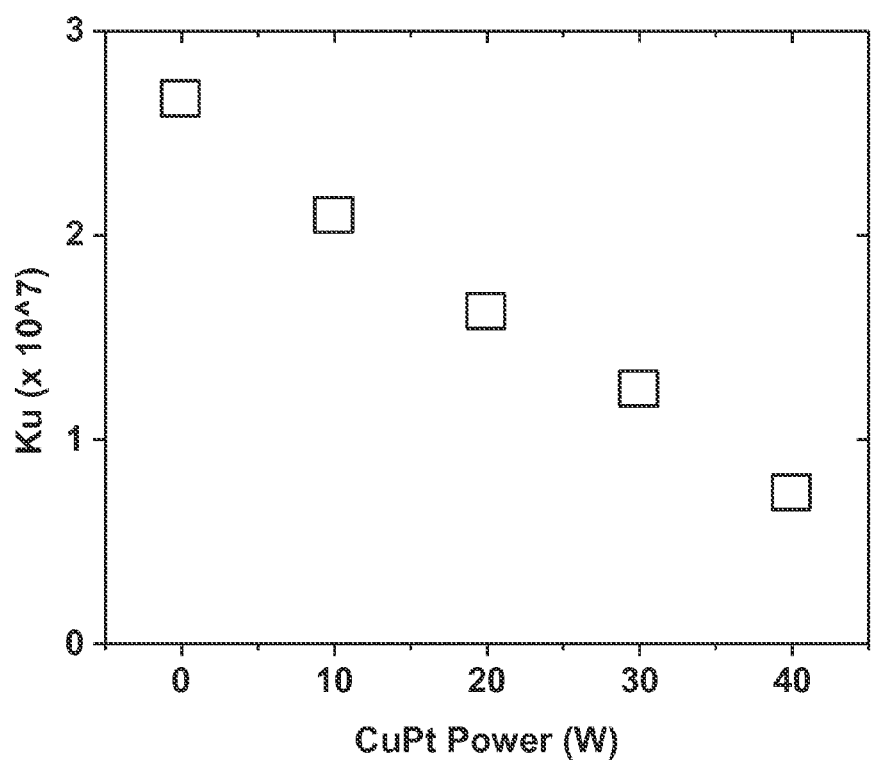
FIG. 17 is a plot of the anisotropy of a $L1_0$FePtCu magnetic recording layer as a function of Cu content.

FIGS. 16 and 17 illustrate coercivity (Hc) and anisotropy (Ku) as a function of Cu content, respectively, tier a $L1_0$FePtCu magnetic recording layer. As particularly shown in FIG. 16, the coercivity decreases with increasing Cu content. While such reduction in coercivity may improve the write-ability of the magnetic media, it also indicates a reduction in anisotropy, which may adversely affect the thermal stability of said media. However, as shown in FIG. 17, a $L1_0$FePtCu magnetic recording layer comprising Cu in a range from greater than 0 at % to less than or equal to about 20 at. % exhibits suitable anisotropy values for heat assisted magnetic recording purposes.

Figure 18:
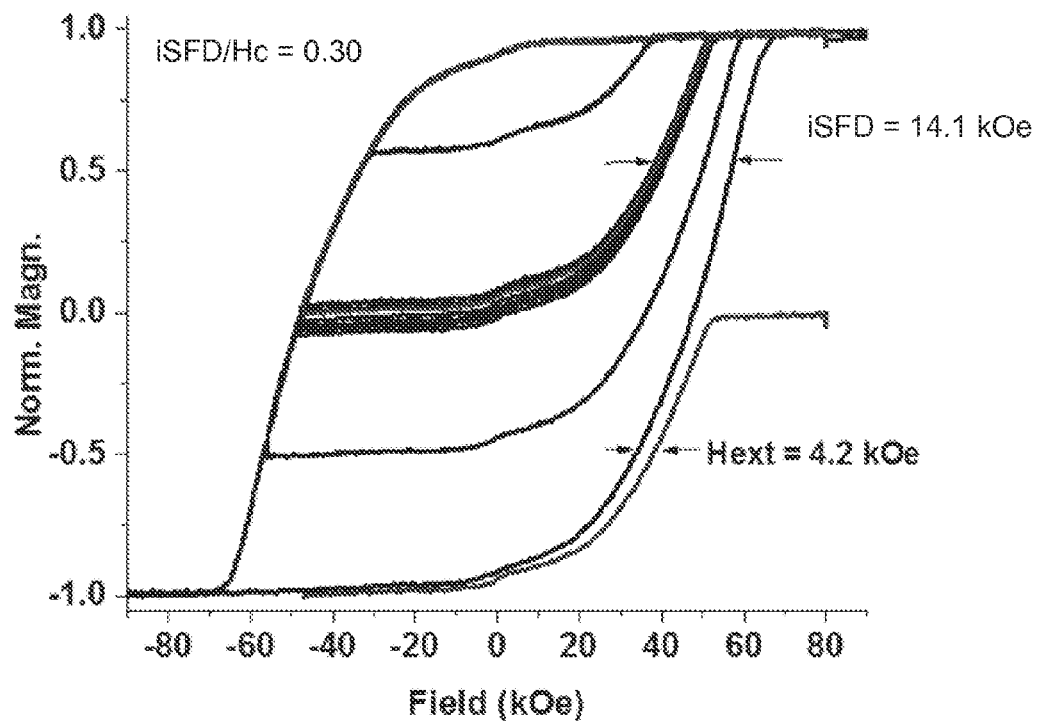
FIG. 18 is a plot of the intrinsic switching field distribution (iSFD) for a $L1_0$FePt magnetic recording layer.
Figure 19:
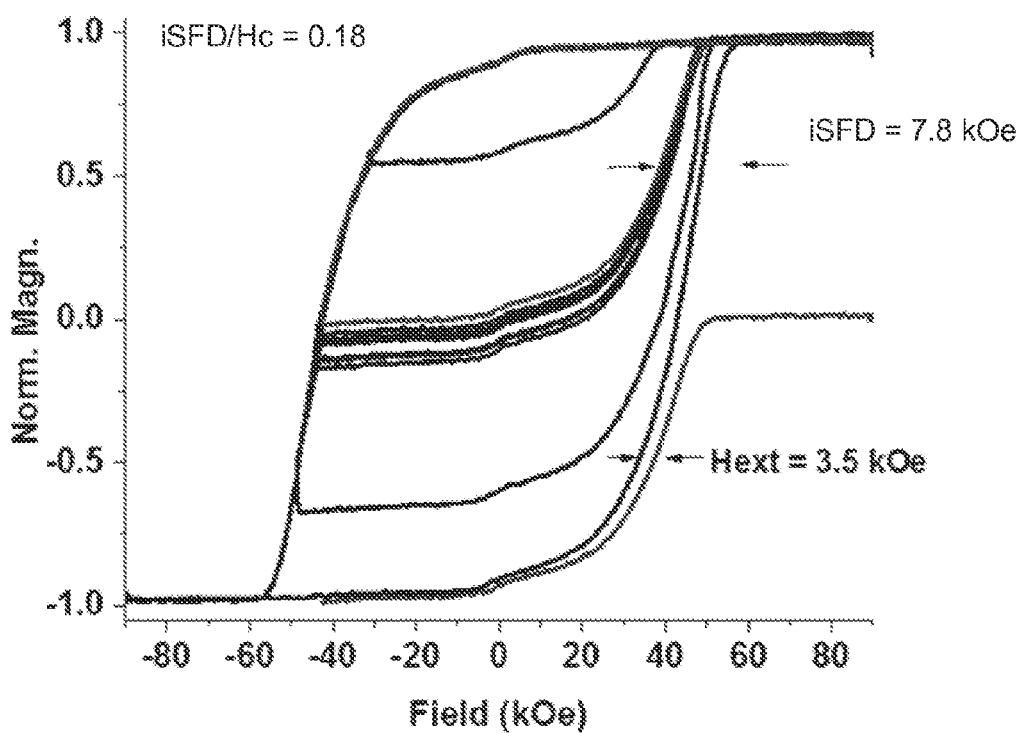
FIG. 19 is a plot of the SFD for a $L1_0$FePtCu magnetic recording layer.

Addition of the Cu alloying element into FePt magnetic grains of the magnetic recording layer also improves the switching field distribution. The magnetization switching phenomenon appears as an aggregation of the magnetization-switched magnetic crystal grains present within the magnetic recording layer. Generally, each of these magnetic crystal grains do not switch from one magnetization state to another at exactly the same switching field. This variation in the switching field is referred to as the switching field distribution (SFD). A large SFD is known to have an undesirable effect on the recording/reproducing characteristics of a magnetic recording medium. The SFDs for a magnetic recording layer comprising FePt magnetic grains and FePtCu magnetic grains due to intrinsic parameters are shown in FIGS. 18 and 19, respectively. Comparison of FIGS. 18 and 19 reveals that a FePtCu-based magnetic recording layer exhibits a iSFD of 7.8 kOe, which is significantly lower than the 14.1 kOe SFD associated with a FePt-based magnetic recording layer.

It is important to note that the improvement in the magnetic properties with addition of Cu in $L1_0$FePt magnetic grains was both surprising and unexpected. In particular, one having ordinary skill in the art would expect that addition of an alloying element, such as Cu, in $L1_0$FePt magnetic grains would adversely affect, or at the very least have no effect on, the remanent magnetization along the easy and hard axes. However, contrary to what was expected based on the current knowledge in the art, the inventors surprisingly discovered that FePtCu magnetic grains with a Cu content in range greater than 0 at. % to less than or equal to about 20 at. % not only exhibited reduced DC media noise, but also an improvement in various magnetic properties. Moreover, it is also important to note that while FIGS. 12-19 illustrate the surprising and unexpected improvements in the magnetic properties associated with $L1_0$FePtCu magnetic grains, such improvement have also been observed for $L1_0$FePtX magnetic grains, where X is at least one of Ag, Au, Ni, and Mn.

Figure 20:
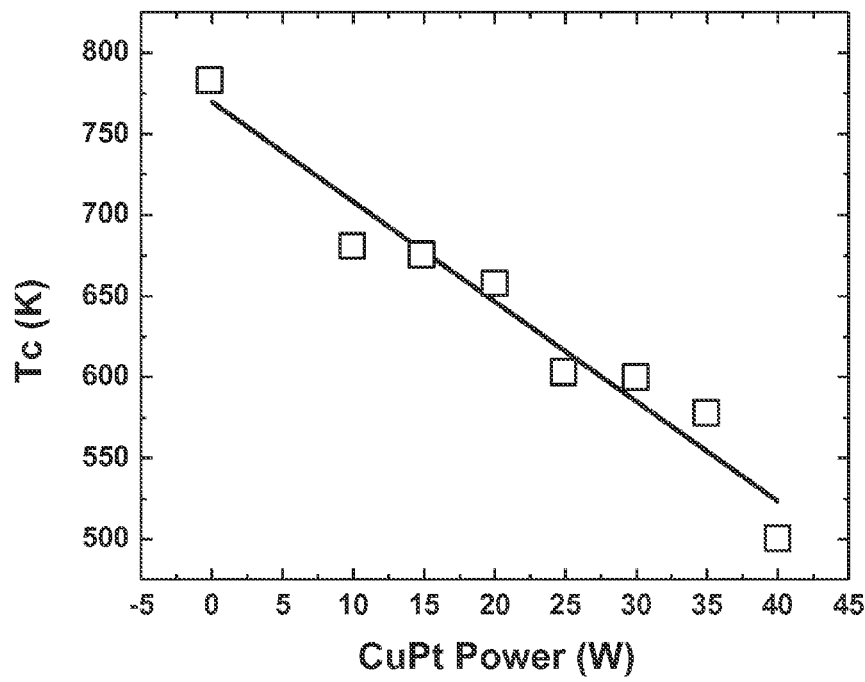
FIG. 20 is a plot illustrating the Curie temperature (Tc) of a $L1_0$FePtCu magnetic recording layer as a function of Cu content.

Another advantage associated with incorporation of Cu into a FePt magnetic recording layer is the reduction in Curie temperature. As noted above, HAMR allows use of magnetic recording materials having higher magnetic anisotropy, and therefore smaller thermally stable grains, as compared to conventional magnetic recording techniques. The use of such is possible with HAMR due to the localized heating of the magnetic materials. Typically, these magnetic materials are heated to a temperature near or above their Curie point, the temperature at which the spontaneous magnetization of a ferromagnetic material disappears. However, achieving such temperatures may not only cause thermal damage to the magnetic head components, but may also damage (e.g., degrade) the overcoat materials and deplete lubricants present above the magnetic recording layer(s). As shown in FIG. 20, incorporation of about 7 at % Cu into the FePt magnetic grains of a magnetic recording layer decreases the Curie temperature by about 100K as compared to magnetic grains having no Cu content. Furthermore, as also shown in FIG. 20, increasing Cu content in the FePt magnetic grains leads to further decreases in the Curie temperature. This decrease in the Curie temperature may help decrease the amount of heat (and thus the amount of Near Field Transducer (NFT) power) needed during HAMR, thereby reducing and/or eliminating possible damage to the magnetic recording head and the magnetic recording medium. Accordingly, this desired decrease in the Curie temperature may ultimately improve long term head disk interface (HDI) properties.

Figure 21:
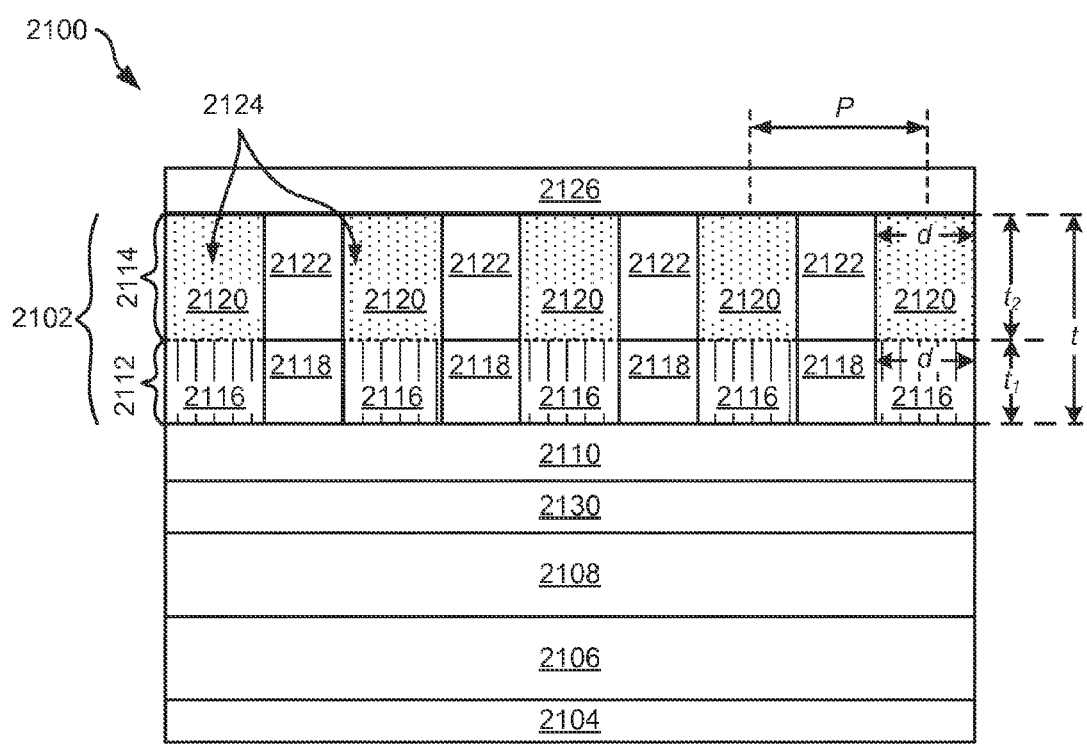
FIG. 21 is a schematic representation of a simplified magnetic recording medium including a magnetic recording bilayer structure, according to one embodiment.

Referring now to FIG. 21, a magnetic recording medium 2100 may include a magnetic recording bilayer structure 2192, according to further embodiments. As an option, the magnetic recording medium 2100 may be implemented in conjunction with features from any other embodiment listed herein, such as those described with reference to the other Figures. Of course, the magnetic recording medium 2100, and others presented herein may be used in various applications and/or in permutations which may or may not be specifically described in the illustrative embodiments listed herein. For instance, various embodiments of the magnetic recording medium 2100 may include more or less layers than those shown in FIG. 21. Moreover, unless otherwise specified, formation of one or more of the layers shown in FIG. 21 may be achieved via atomic layer deposition (ALD), chemical vapor deposition (CVD), evaporation, e-beam evaporation, ion beam deposition, sputtering, or other deposition technique as would become apparent to a skilled artisan upon reading the present disclosure. Further, the magnetic recording medium 2100 and others presented herein may be used in any desired environment.

As shown in FIG. 21, the magnetic recording medium 2100 includes a substrate 2104 comprising a material of high rigidity, such as glass, Al, $Al_2O_3$, MgO, Si, or other suitable substrate material as would be understood by one having skill in the art upon reading the present disclosure. In preferred approaches, the substrate 2104 includes a material that allows media deposition at elevated temperatures, e.g., on the order of 600-800° C.

The magnetic recording medium 2100 also includes an adhesion layer 2106 positioned above the substrate 2104. In various approaches, the adhesion layer 2106 may comprise Ni, Ta, Ti, and/or alloys thereof. In preferred approaches, the adhesion layer may comprise an amorphous material that does not affect the crystal orientation of the layers deposited thereon. Moreover, the adhesion layer 2106 may have a thickness in a range from about 5 nm to about 300 nm in some approaches.

The magnetic recording medium 2100 additionally includes a heat dissipating (heat sink) layer 2108 positioned above the adhesion layer 2106. The heat sink layer 2108, which may include a material having a high thermal conductivity (e.g., greater than 30 W/m-K, preferably greater than 100 W/m-K) may be particularly useful for HAMR purposes. For instance, the heat sink layer 2108 is configured to allow heat deposited in one or more magnetic layers positioned thereabove to quickly dissipate and limits lateral heat flow in said magnetic layer(s), thus introducing directional vertical heat flow, which allows for a small heat spot and high thermal gradient during recording. In various approaches, this heat sink layer 2108 may be a plasmonic layer. Suitable materials for the heat sink layer 2108 may include, but are not limited to Ta, Ti, Cr, Fe, Cu, Ag, Pt, Au, Cr, Mo, W, Rh, Ru, etc. and alloys thereof (e.g., CrTiB, CrWSi, etc.). In some approaches the heat sink layer 2108 may have a thickness in a range from about 10 nm to about 100 nm.

As also shown in FIG. 21, the magnetic recording medium includes an optional thermal barrier layer 2130 positioned above the heat sink layer 2108. In some approaches, the thermal barrier layer 2130 may have a thickness in a range from about 2 to about 50 nm. In more approaches, the thermal barrier layer 2130 may be optically transparent or absorbing depending on the specific NFT head type used for HAMR. For non-absorbing thermal barrier layers, alloys such as NiTa and/or other SUL-like materials with reduced Co or Fe amount may be used so that they become non-magnetic for the case of absorbing barrier layers in particular approaches.

In still more approaches, the thermal barrier layer 2130 may include a material having a low thermal conductivity (e.g., preferably in a range from 0.5 to 10 W/m-K). Materials suitable for use in the thermal barrier layer 2130 may include but are not limited to, oxides such as $SiO_2$, Ta-oxides, and other suitable oxides with low thermal conductivity as would become apparent to one having skill in the art upon reading the present disclosure. For HAMR purposes, it may particular advantageous for the magnetic recording medium 2100 to include a heat sink layer 2108 with a high thermal conductivity and a thermal barrier layer 2130 positioned thereabove with a low thermal conductivity in order to achieve a high lateral thermal gradient in the magnetic recording layer(s) without having to use excessively high laser power to reach the Tc in the magnetic recording layer(s). Avoiding the use of excessively high laser power to reach the Tc in the magnetic recording layer(s) may extend the lifetime and reliability of the head.

The magnetic recording medium 2100 further includes a seed layer 2110 positioned above the thermal barrier layer 2130. The seed layer 2110 may act as a texture defining layer, e.g., configured to influence the epitaxial growth of the magnetic recording layers 2112, 2114 formed thereabove. In some approaches, the seed layer 2110 may include MgO, TiN, $MgTiO_x$, $MgO—SiO_x$, $SrTiO_x$, TiC, MgFeOx etc. or suitable seed layer materials as would become apparent to one skilled in the art upon reading the present disclosure. In more approaches, the seed layer 2110 may have a bilayer structure, e.g., with a lower CrRu layer and an upper Pt layer on the CrRu layer. In yet more approaches the seed layer 2110 may have a thickness in a range from about 2 nm to about 20 nm in some approaches.

While not shown in FIG. 21, an optional soft magnetic underlayer may be positioned between the adhesion layer 2106 and the seed layer 2110. This soft magnetic underlayer may be configured to promote data recording in the magnetic recording layers 2112, 2114. Accordingly, in preferred approaches, this soft magnetic underlayer may include a material having a high magnetic permeability. Suitable materials for the soft magnetic underlayer may include, but are not limited to, Fe, FeNi, FeCo, a Fe-based alloy, a FeNi-based alloy, a FeCo-based alloy, Co-based ferromagnetic alloys, and combinations thereof In some approaches, this soft magnetic underlayer may include a single layer structure or a multilayer structure. For instance, one example of a multilayer soft magnetic underlayer structure may include a coupling layer (e.g., including Ru) sandwiched between one or more soft magnetic underlayers, where the coupling layer is configured to induce an anti-ferromagnetic coupling between one or more soft magnetic underlayers. In some approaches, the soft magnetic underlayer may be a laminated or multilayered soft magnetic underlayer structure including multiple soft magnetic films separated by non-magnetic films, such as electrically conductive films of Al or CoCr. In more approaches, the soft magnetic underlayer may also be a laminated or multilayered soft magnetic underlayer structure including multiple soft magnetic films separated by interlayer films that mediate an antiferromagnetic coupling, such as Ru, Ir, or Cr or alloys thereof.

It is important to note that in some approaches, the magnetic recording medium 2100 may include the heat sink layer 2108 and a soft magnetic underlayer, both of which may be positioned between the adhesion layer 2106 and the seed layer 2110. In approaches where both a soft magnetic underlayer and a heat sink layer 2108 are present, the soft magnetic underlayer may be positioned above or below the heat sink layer 2108, as equivalent effects may be provided regardless of the position of the soft magnetic underlayer relative to the heat sink layer 2108.

While not shown in FIG. 21, an optional onset layer may be positioned above the seed layer 2110 and below the magnetic recording bilayer structure 2102. In various approaches, this optional onset layer may be configured to promote formation of the magnetic recording layers 2112, 2114 deposited thereabove. In particular approaches, the optional onset layer may include FePt.

The magnetic recording medium 2100 includes the magnetic recording bilayer structure 2102 present above the seed layer 2110, as shown in FIG. 21. The magnetic recording bilayer structure 2102 includes a first magnetic recording layer 2112 and a second magnetic recording layer 2114 positioned above the first magnetic recording layer 2112. The first magnetic recording layer 2112 includes a plurality of magnetic grains 2116 separated by a first segregant 2118. Similarly, the second magnetic recording layer 2114 includes a plurality of magnetic grains 2120 separated by a second segregant 2122. In preferred approaches, the plurality of magnetic grains 2116, 2120 in the first and second magnetic recording layers 2112, 2114 may have a columnar shape.

Each of the magnetic recording layers 2112, 2114 may be formed using a sputtering process. Fear example, formation of a magnetic recording layer may involve sputtering the magnetic grain material(s) and the segregant material(s) from the same target in one approach; however, in another approach, the magnetic grain material(s) and/or segregant component(s) may be sputtered from different, respective targets. Moreover, formation of a magnetic recording layer preferably involves simultaneous deposition of the magnetic grain material(s) and segregant material(s) onto the magnetic recording medium 2100 in a heated environment, e.g., from about 400 degrees to about 800° C.

To facilitate a conformal growth of the first and second magnetic recording layers 2112, 2114, an etching step is preferably (but not necessarily) performed on each of the respective magnetic layers after they are formed. Thus, an etching step may be used to define the upper surface of each of the magnetic layers and expose the material of the magnetic layer, e.g., before an additional layer is formed there above. According to various approaches, the etching step may include an Inductively Coupled Plasma (ICP) etch step, etc. or any other etching process that would become apparent to one skilled in the art upon reading the present disclosure Accordingly, the magnetic grains 2120 of the second magnetic recording layer 2114 may be physically characterized by growth directly on the magnetic grains 2116 of the first magnetic recording layer 2112, which may primarily be due to the etching step noted above. Thus, each of the magnetic grains 2120 of the second magnetic recording layer 2114 that are formed directly above the magnetic grains 2116 of the first magnetic recording layer 2112 may form a larger composite magnetic grain 2124 that extends along the total thickness, t, of the magnetic recording bilayerstructure 2102.

In some approaches, the total thickness, t, of the magnetic recording bilayer structure 2102 may be between about 2 nm to about 20 nm. In more approaches, each of the two magnetic recording layers 2112, 2114 may have a respective thickness $t_1$, $t_2$ in a range from greater than 0 nm to less than or equal to about 15 nm. Moreover, the thicknesses $t_1$ and $t_2$ may be the same or different in various approaches. In preferred approaches, the thickness $t_1$ of the first magnetic recording layer 2112 may be in a range from greater than 0 nm to less than or equal to about 3 nm. In yet more preferred approaches, the thickness $t_2$ of the second magnetic recording layer 2114 may be in a range from greater about 3 nm to about 15 nm.

In numerous approaches, an average pitch, P, (center-to-center spacing) of the magnetic grains 2116, 2120 in the first and/or second magnetic recording layers 2112, 2114 may be in a range from about 3 nm to about 11 nm, but could be higher or lower depending on the desired application. Furthermore, an average diameter, d, of the magnetic grains 2116, 2120 in the first and/or second magnetic recording layers 2112, 2114 may preferably be in a range from about 2 nm to about 10 nm, but could be higher or lower depending on the desired application.

In preferred approaches, the composite magnetic grains 2124 (e.g., each of which is comprised of a magnetic grain 2120 of the second magnetic recording layer 2114 that is positioned directly above a magnetic grain 2116 of the first magnetic recording layer 2112) may have an average aspect ratio (i.e., total thickness, t, to diameter, d) of about 1.5, but could be higher or lower depending on the desired application.

In some approaches, the magnetic grains 2116 of the first magnetic recording layer 2112 may include chemically ordered $L1_0$FePtX, where X may include one or more of Ag, Cu, Au, Ni, Mn, Pd, etc. In particular approaches where the magnetic grains 2116 of the first magnetic recording layer 2112 include FePtX, the amount of X therein may be in a range from about 5 at % to about 20 at. %. In further approaches where the magnetic grains 2116 of the first magnetic recording layer 2112 includes FePtX, the amount of Pt therein may be 50 at. %, and the combined amount of Fe and X may be 50 at % (i.e., Fe(50-n at. %)X(n at. %)Pt(50 at. %)).

In preferred approaches, the magnetic grains 2116 of the first magnetic recording layer 2112 may include chemically ordered $L1_0$FePtCu. In additional approaches, the magnetic grains 2116 of the first magnetic recording layer 2112 may include one or more materials that are the same or different from the materials comprising the magnetic grains 2120 of the second magnetic recording layer 2114.

In various approaches, the magnetic grains 2120 of the second magnetic recording layer 2114 may include chemically ordered $L1_0$FePt. In one particular approach, the magnetic grains 2120 of the second magnetic recording layer 2114 may include chemically ordered $L1_0$FePt having no Cu incorporated therein. In another particular approach, the magnetic grains 2120 of the second magnetic recording layer 2114 may include chemically ordered $L1_0$FePtCu.

In yet other approaches, the magnetic grains 2120 of the second magnetic recording layer 2114 may include chemically ordered $L1_0$FePtY, where Y may include one or more of Ag, Cu, Au, Ni, Mn, Pd, etc. In some approaches where the magnetic grains 2120 of the second magnetic recording layer 2114 include FePtY, the amount of Y therein may be in a range from about 5 at % to about 20 at. %. further approaches where the magnetic grains 2120 of the second magnetic recording layer 2114 include FePtY, the amount of Pt therein may be 50 at. %, and the combined amount of Fe and Y may be 50 at % (i.e., Fe(50-n at. %)Y(n at. %)Pt(50 at. %)).

In some approaches where the magnetic grains 2116 of the first magnetic recording layer includes $L1_0$FePtX and the agnetic grains 2120 of the second magnetic recording layer 2114 include $L1_0$FePtY, the amount of Y in the second recording layer 2114 may be the same as the amount of X in the first magnetic recording layer 2112. For example, in one particular approach, each of the magnetic grains 2116, 2120 of the first and second magnetic recording layers 2112, 2114 may include FePtCu with the same amount of Cu therein.

In other preferred approaches where the magnetic grains 2116 of the first magnetic recording layer includes $L1_0$FePtX and the magnetic grains 2120 of the second magnetic recording layer 2114 include $L1_0$FePtY, the amount of Y in the second recording layer 2114 may preferably be less than the amount of X in the first magnetic recording layer 2112. For instance, in one particular approach, each of magnetic grains 2116, 2120 of the first and second magnetic recording layers 2112, 2114 may include FePtCu, where the amount of Cu in the magnetic grains 2120 of the second magnetic recording layer 2114 is preferably less than the amount of Cu in the magnetic grains 2116 of the first magnetic recording layer 2112.

In particular approaches, the second magnetic recording layer 2114 may have a higher Curie temperature than the first magnetic recording layer 2112. This may typically be achieved in approaches: (1) where the first magnetic recording layer 2112 includes FePtX and the second magnetic recording layer 2114 includes FePt (with no additional alloying element); or where the first magnetic recording layer 2112 includes FePtX and the second magnetic recording layer 2114 includes FePtY, with the amount of Y in the second magnetic recording layer being lower than the amount of X in the first magnetic recording layer. In some approaches, the second magnetic recording layer 2114 may have a Curie temperature that is at least 40-60 Kelvin higher than the first magnetic recording layer 2112.

Figure 22:
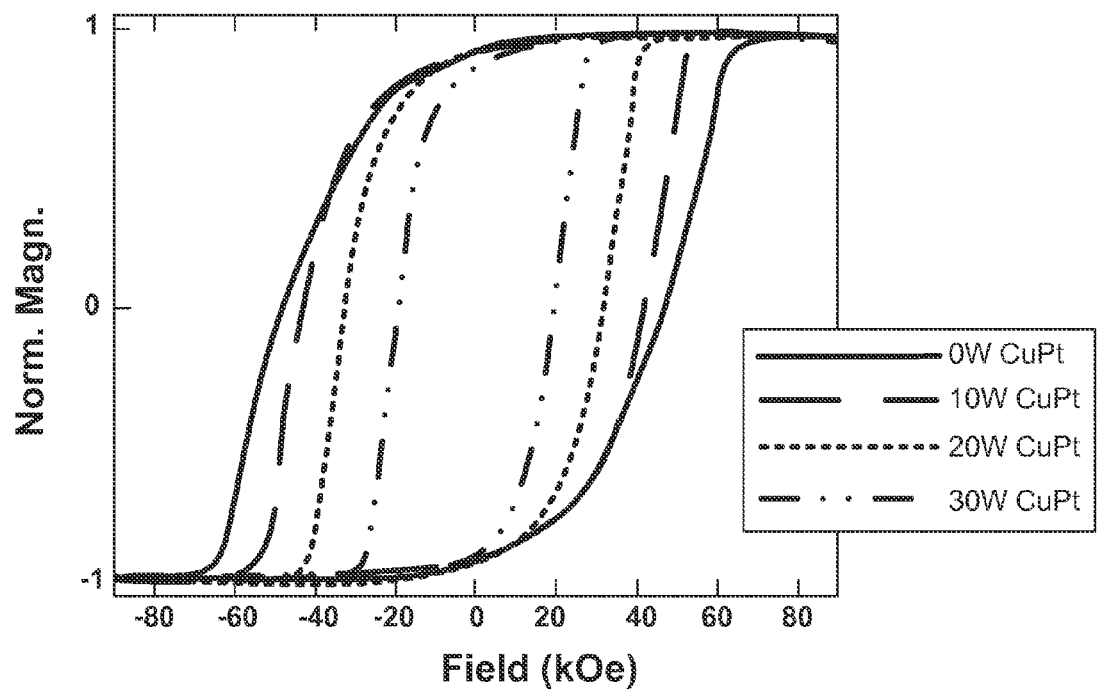
FIG. 22 illustrates easy axis hysteresis loops for various magnetic bilayer recording layer structures, each of which have a different Cu content/amount therein. Each of the magnetic recording layer structures in FIG. 22 includes $L1_0$FePtCu magnetic grains, with Cu alloyed throughout the entire structure.
Figure 23:
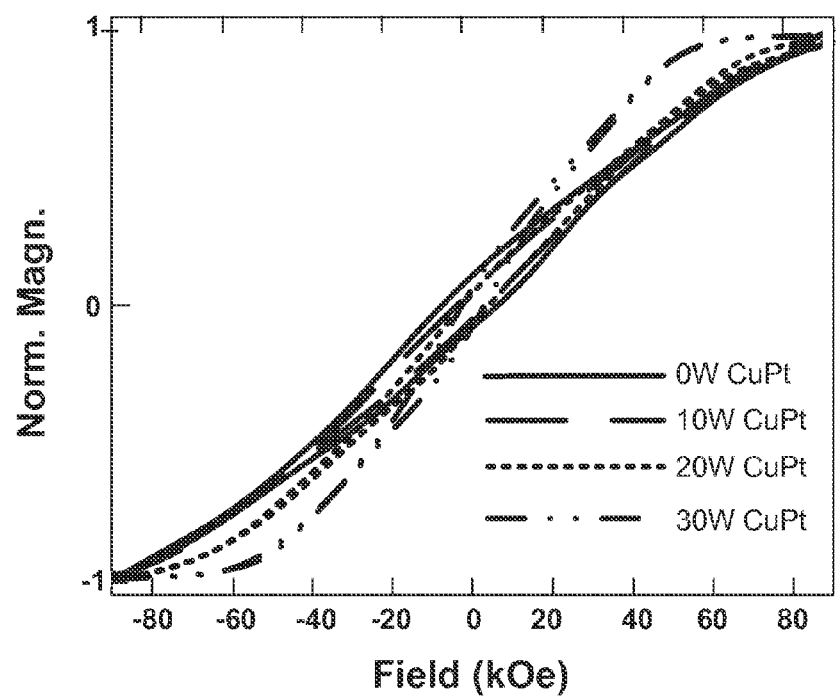
FIG. 23 illustrates hard axis hysteresis loops for various magnetic bilayer recording layer structures, each of which have a different Cu content/amount therein. Each of the magnetic recording layer structures in FIG. 23 includes $L1_0$FePtCu magnetic grains, with Cu alloyed throughout the entire structure.

As noted above, in one exemplary approach, the alloying element Cu may be incorporated throughout the entire magnetic recording bilayer structure 2102 (e.g., each of the magnetic grains 2116, 2120 of the first and second magnetic recording layers 2112, 2114 may include FePtCu with the same amount of Cu therein). In this exemplary approach, the magnetic recording bilayer structure 2102 may effectively be considered as having a single magnetic recording layer comprising FePtCu magnetic grains. The magnetic properties of this exemplary magnetic recording bilayer structure 2102 are illustrated in FIGS. 22-23. Specifically, FIGS. 22 and 23 illustrates the easy axis and hard axis hysteresis loops, respectively, for this exemplary magnetic recording bilayer structure 2102. As noted previously, the improvement in the c-axis orientation of the magnetic grains in the magnetic recording bilayer structure 2102 with increasing Cu content leads to a marked improvement in the remanent magnetization along the hard axis.

While incorporation of Cu throughout the entirety of the magnetic recording bilayer structure 2102 may result in improved magnetic properties, as illustrated in FIGS. 22-23, such a configuration may also result in increased transition noise (jitter) in some instances. While not wishing to be bound to a particular theory, it is believed that such an increase in jitter may occur for one or all of the following reasons: (1) reduction in anisotropy may translate to lower dHk/dt and thus a lower writing field gradient; and (2) reduction in maximum peak temperature may result in a reduced thermal gradient and thus a lower writing field gradient.

Accordingly, in another exemplary approach, the alloying element Cu may be incorporated only throughout the first magnetic recording layer 2112 of the magnetic recording bilayer structure 2102 (e.g., the magnetic grains 2116 of the first magnetic recording layer 2112 include FePtCu, whereas the magnetic grains 2120 of the second magnetic recording layer 2114 include FePt with no Cu therein). The Cu-rich magnetic grains 2116 in the first magnetic recording layer 2112 may help to direct the proper crystallographic orientation of the FePt magnetic grains 2120 in the second magnetic recording layer 2114. Moreover, the magnetic recording bilayer structure 2102 having a Cu-rich first magnetic recording layer 2112 and a Cu-free second magnetic recording layer 2114 may exhibit improved magnetic properties relative to an otherwise identical magnetic bilayer structure having no Cu throughout the entire structure or, alternatively, to an otherwise identical magnetic bilayer structure having Cu throughout the entire structure.

Figure 24:
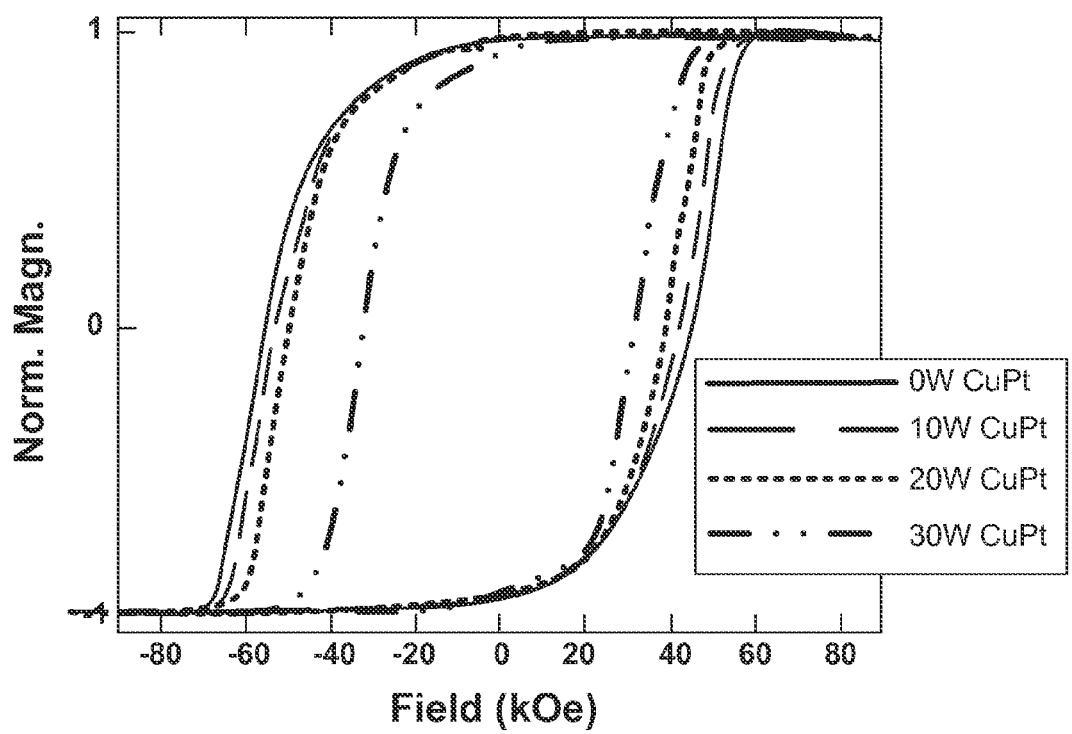
FIG. 24 illustrates easy axis hysteresis loops for various magnetic bilayer recording layer structures, each of which have a different Cu content/amount therein. Each of the magnetic recording layer structures in FIG. 24 includes a first $L1_0$FePtCu magnetic recording layer and a second $L1_0$FePt magnetic recording layer positioned thereabove.
Figure 25:
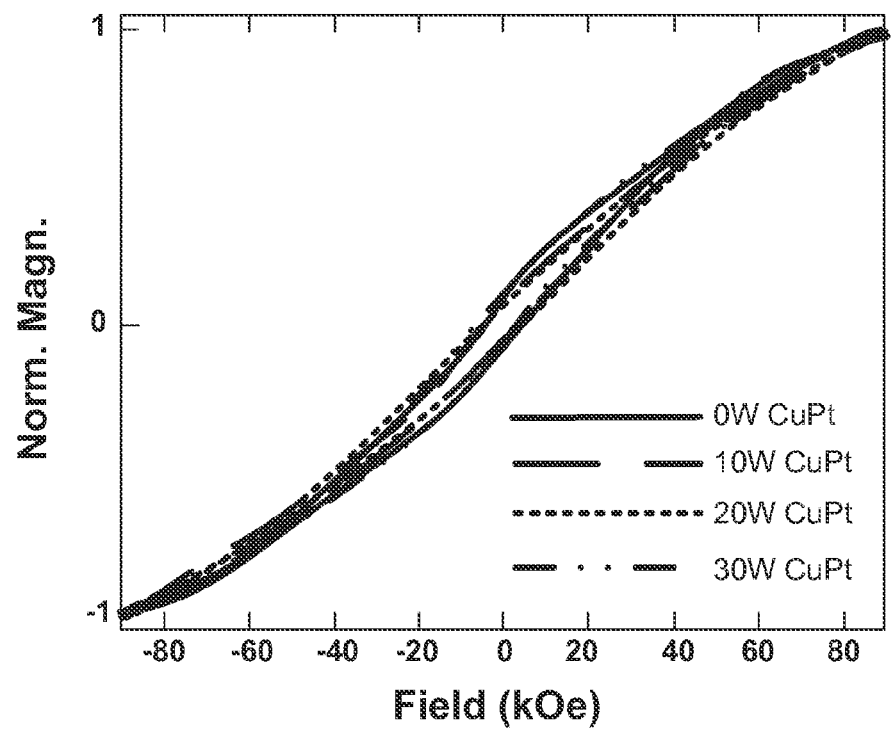
FIG. 25 illustrates hard axis hysteresis loops for various magnetic bilayer recording layer structures, each of which have a different Cu content/amount therein. Each of the magnetic recording layer structures in FIG. 25 includes a first $L1_0$FePtCu magnetic recording layer and a second $L1_0$FePt magnetic recording layer positioned thereabove.
Figure 26:
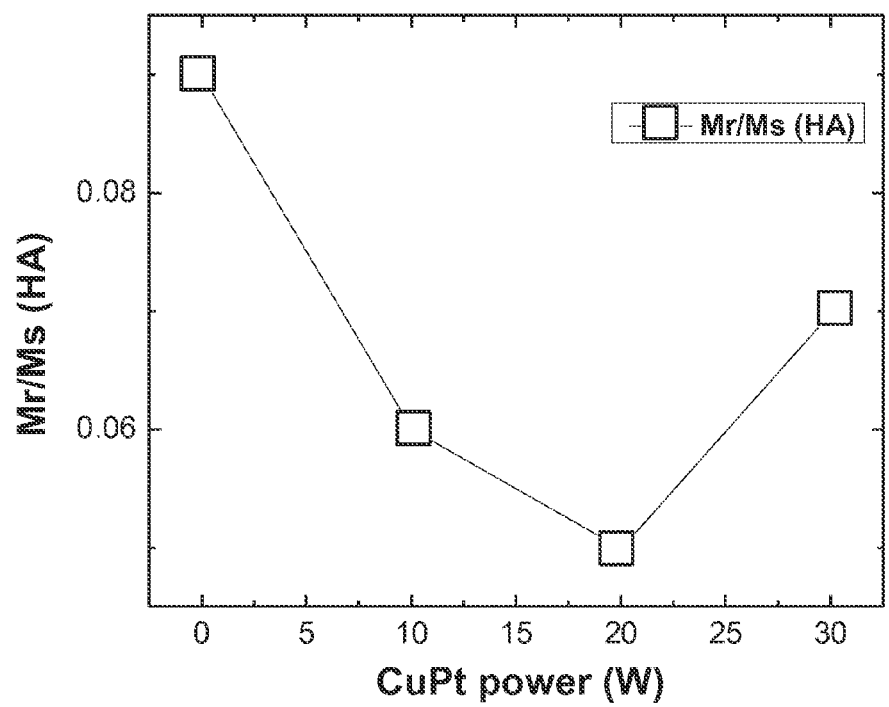
FIG. 26 is a plot of the remanent magnetization along the hard axis as a function of Cu content for a magnetic recording layer structure including a first $L1_0$FePtCu magnetic recording layer and a second $L1_0$FePt magnetic recording layer positioned thereabove.

The magnetic properties of the magnetic recording bilayer structure 2102 having Cu in only the magnetic grains 2116 of the first magnetic recording layer 2112 are illustrated in FIGS. 24-26. Specifically, FIGS. 24 and 25 illustrates the easy axis and hard axis hysteresis loops, respectively, for this particular composition of the magnetic recording bilayer structure 2102, and. FIG. 26 provides a plot of the hard axis remanent magnetization as a function of Cu. The improvement in the remanent magnetization along the hard axis with increasing Cu content as shown in FIG. 26 is again indicative of the improved c-axis orientation of the magnetic grains.

Figure 27:
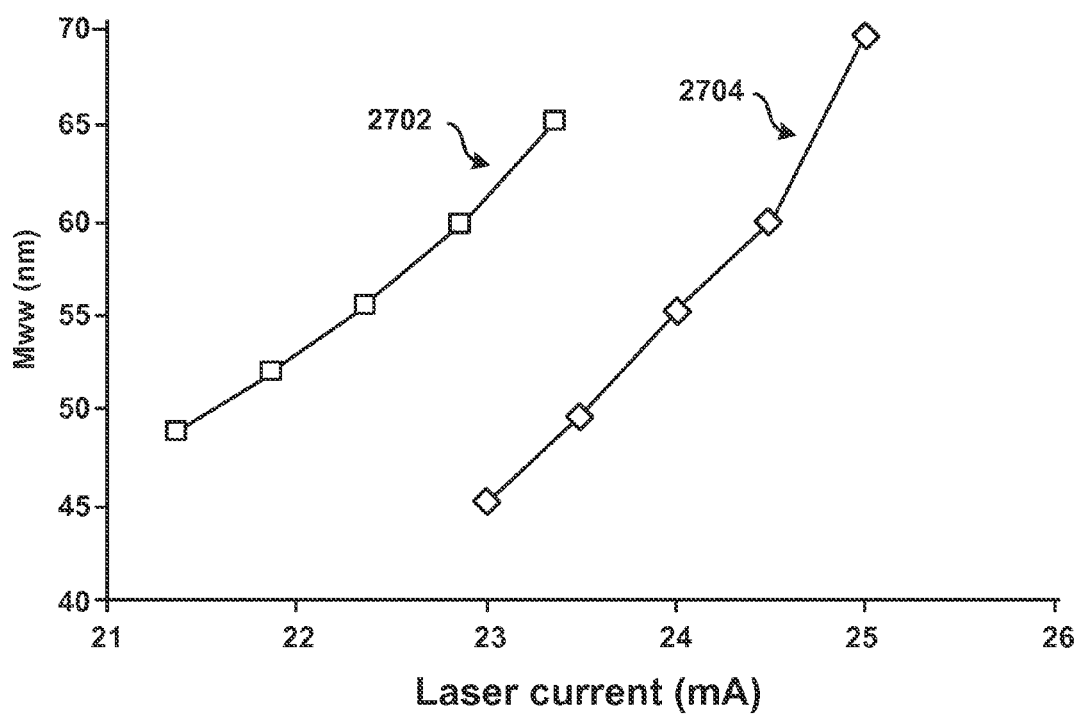
FIG. 27 a plot of the recording width (magnetic write width MWW) versus the laser current applied during recording for a magnetic recording bilayer structure having Cu only throughout the first magnetic recording layer, and a magnetic recording bilayer structure having no Cu therein.
Figure 28:
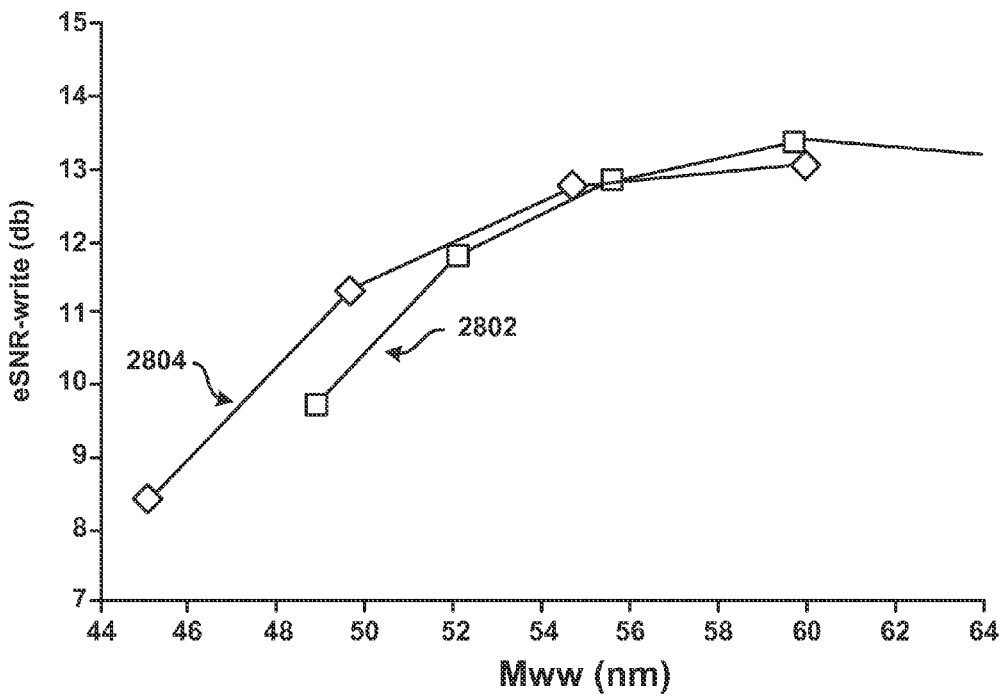
FIG. 28 is a plot of the signal-to-noise (SNR) ratio versus MWW for a magnetic recording bilayer structure having Cu only throughout the first magnetic recording layer, and a magnetic recording bilayer structure having no Cu therein.

Spin stand measurements further reveal that a magnetic recording bilayer structure having only throughout a portion the structure, as opposed to having no Cu throughout the entire structure, exhibits improved writability, improved DC SNR performance and maintains good transition noise. For example, FIG. 27 shows a plot of the recording width (magnetic write width MWW) versus the laser current applied during recording for two magnetic recording bilayer layer structures: a structure 2702 having Cu only throughout the first magnetic recording layer, and a structure 2704 having no Cu. As evident from FIG. 27, 25% less laser power is required to write to the structure 2702 having Cu only throughout the first magnetic recording layer compared to the Cu-free structure. FIG. 28 illustrates a plot of the signal-to-noise (SNR) ratio versus MWW for two magnetic recording bilayer layer structures: a structure 2802 having Cu only throughout the first magnetic recording layer, and a structure 2804 having no Cu. As shown in FIG. 28, the two structures 2802, 2804 exhibit comparable SNR performance.

With continued reference to FIG. 21, in additional approaches there may he a gradual gradient in the Cu amount extending throughout the composite magnetic grains 2124 in a thickness direction (e.g., direction oriented parallel to the substrate normal) such that the lowermost portions of each composite grain 2124 (e.g. the portions positioned closest to the substrate 2104) contain a greater amount of Cu than the uppermost portions thereof (e.g. the portions positioned closest to the capping layer(s) 2126).

As further shown in FIG. 21, the first and second magnetic recording layers 2112, 2114 may each include one or more segregant materials. For instance, the first segregant 2118 of the first magnetic recording layer 2112 and/or the second segregant 2122 of the second magnetic recording layer 2114 may each individually include C, $SiO_2$, $TiO_x$, AlN, TaN, W, Ti, TiC, TiN, BC, BN, SiN, SiC, $TiO_2$, $CrO_x$, CrN, $AlO_x$, $Al_2O_3$, MgO, $Ta_2O_5$, $B_2O_3$, etc., and combinations thereof in various approaches. It is important to note that the first segregant 2118 may include one or more materials that are the same or different as those comprising the second segregant 2122.

As additionally shown in FIG. 21, the magnetic recording medium 2100 includes one or more capping layers 2126 present above the magnetic recording bilayer structure 2102. The one or more capping layers 2126 may be configured to mediate the intergranular coupling of the magnetic grains present in the magnetic recording layer(s). In some approaches, the one or more capping layers 2126 may include, for example, a Co-, CoCr-, CoPtCr-, and/or CoPt-CrB-based alloy, or other material suitable for use in a capping layer as would be recognized by one having skill in the art upon reading the present disclosure. In more approaches, the one or more capping layers 2126 may include continuous magnetic capping layers (i.e., layers without segregant materials included therein), granular magnetic capping layers (i.e. layers with segregants materials included therein) and/or combinations thereof. In approaches where at least one of the one or more capping layers 2126 includes a granular magnetic capping layer, any of the segregants disclosed herein may be included in said layer.

While not shown in FIG. 21, the magnetic recording medium 2100 may further include a protective overcoat layer positioned above the one or more capping layers 2126. The protective overcoat layer may be configured to protect the underlying layers from wear, corrosion, etc. This protective overcoat layer may be made of, for example, diamond-like carbon, carbon nitride, Si-nitride, BN or B4C, etc. or other such materials suitable for a protective overcoat as would be understood by one having skill in the art upon reading the present disclosure. Additionally, the magnetic recording medium 2100 may also include an optional lubricant layer positioned above the protective overcoat layer if present. The material of the lubricant layer may include, but is not limited to perfluoropolyether, fluorinated alcohol, fluorinated carboxylic acids etc., or other suitable lubricant material as known in the art.

Figure 29:
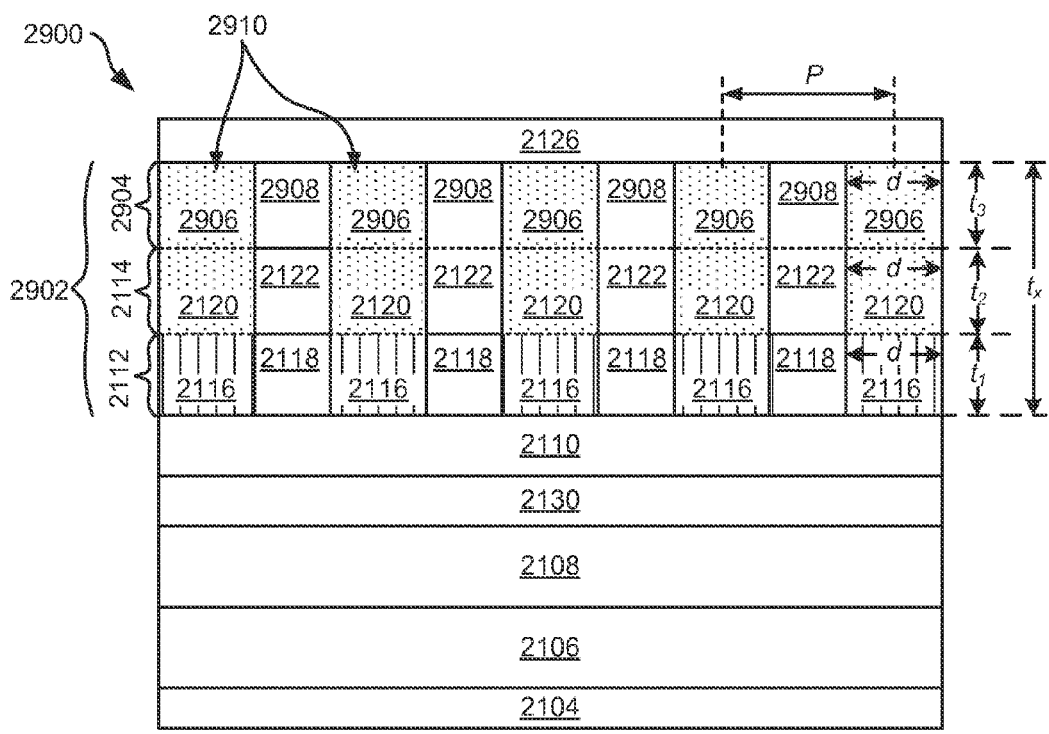
FIG. 29 is a schematic diagram of the simplified magnetic recording medium of FIG. 21 including at least three magnetic recording layers, according to one embodiment.

It is important o note that the magnetic recording medium 2100 of FIG. 21 may include more than two magnetic recording layers in various approaches. FIG. 29 provides one such exemplary embodiment of a magnetic recording medium 2900, where said magnetic recording medium includes at least three magnetic recording layers. As FIG. 29 depicts one exemplary variation of the magnetic recording medium 2100 of FIG. 21, components of FIG. 29 have common numbering with those of FIG. 21.

As shown in in FIG. 29, the magnetic recording medium 2900 includes a magnetic recording multilayer structure 2902 having an optional third magnetic recording layer 2904 positioned above the second magnetic recording layer 2114. This third magnetic recording layer 2904 includes a plurality of magnetic grains 2906 separated by a third segregant 2908. In preferred approaches, the plurality of magnetic grains 2116, 2120, 2906 in the first, second and third magnetic recording layers 2112, 2114, 2904 may have a columnar shape.

Similar to the first and second magnetic recording layers 2112, 2114, the third magnetic recording layer 2904 may be formed using a sputtering process. For example, formation of the third magnetic recording layer 2904 may involve sputtering the magnetic grain material(s) and the segregant material(s) from the same target in one approach; however, in another approach, the magnetic grain material(s) and/or segregant component(s) may be sputtered from different, respective targets. Moreover, formation of the third magnetic recording layer 2904 preferably involves simultaneous deposition of the magnetic grain material(s) and segregant material(s) onto the magnetic recording medium 2900 in a heated environment, e.g., from about 400 degrees to about 800° C.

To facilitate a conformal growth of the first, second and third magnetic recording layers 2112, 2114, 2904, an etching step is preferably (but not necessarily) performed on each of the respective magnetic layers after they are formed. Thus, an etching step may be used to define the upper surface of each of the magnetic layers and expose the material of the magnetic layer, e.g., before an additional layer is formed there above. According to various approaches, the etching step may include an Inductively Coupled Plasma (ICP) etch step, etc. or any other etching process that would become apparent to one skilled in the art upon reading the present disclosure.

Accordingly, the magnetic grains 2906 of the third magnetic recording layer 2904 may be physically characterized by growth directly on the magnetic grains 2120 of the second magnetic recording layer 2114, which in turn may be physically characterized by growth directly on the magnetic grains 2116 of the first magnetic recording layer 2112. Thus, each of the magnetic grains 2906 of the third magnetic recording layer 2904 that are formed directly above the magnetic grains 2120, 2116 of the second and first magnetic recording layers 2114, 2112 may form a larger composite magnetic grain 2910 that extends along the total thickness, $t_x$, of the magnetic recording structure 2102.

In some approaches, the total thickness, $t_x$, of the magnetic recording multilayer structure 2902 may be between about 3 nm to about 20 nm. In more approaches, each of the three magnetic recording layers 2112, 2114, 2904 may have a respective thickness $t_1, t_2, t_3$ in a range from greater than 0 nm to less than or equal to about 15 nm. Moreover, one, two or all of the thicknesses $t_1, t_2,$ and $t_3$ may be the same or different in various approaches.

In numerous approaches, an average pitch, P, (center-to-center spacing) of the magnetic grains 2120, 2124, 2906 in the first, second and/or third magnetic recording layers 2112, 2114, 2904 may be in a range from about 2 nm to about 11 nm, but could be higher or lower depending on the desired application. Furthermore, an average diameter, d, of the magnetic grains 2120, 2124, 2906 in the first, second and/or third magnetic recording layers 2112, 2114, 2904 may preferably be in a range from about 2 nm to about 10 nm, but could be higher or lower depending on the desired application.

In preferred approaches, the composite magnetic grains 2910 (e.g., each of which is comprised of a magnetic grain 2906 of the third magnetic recording layer 2904 that is positioned directly above a magnetic grain 2120 of the second magnetic recording layer 2114, which is in turn positioned directly above a magnetic grain 2116 of the first magnetic recording layer 2112) may have an average aspect ratio (i.e., total thickness, t, to diameter, d) of about 1.5 or larger.

As noted previously, the magnetic grains 2116 of the first magnetic recording layer 2112 may, in some approaches, include chemically ordered $L1_0FePtX$, where X may include one or more of Ag, Cu, Au, Ni, Mn, Pd, etc. In numerous approaches where the magnetic grains 2116 of the first magnetic recording layer 2112 include FePtX, the amount of X therein may be in a range from about 5 at % to about 20 at. % in more approaches. In further approaches where the magnetic grains 2116 of the first magnetic recording layer 2112 includes FePtX, the amount of Pt therein may be 50 at. %, and the combined amount of Fe and X may be 50 at % (i.e., Fe(50-n at. %)X(n at. %)Pt(50 at. %)).

In preferred approaches, the magnetic grains 2116 of the first magnetic recording layer 2112 may include chemically ordered $L1_0FePtCu$. In additional approaches, the magnetic grains 2116 of the first magnetic recording layer 2112 may include one or more materials that are the same or different from the materials comprising the magnetic grains 2120 of the second magnetic recording layer 2114 and/or the magnetic grains 2906 of the third magnetic recording layer 2904.

As also noted previously, the magnetic grains 2120 of the second magnetic recording layer 2114 may, in various approaches, include chemically ordered $L1_0FePt$. In other approaches, the magnetic grains 2120 of the second magnetic recording layer 2114 may include chemically ordered $L1_0FePt$ having no Cu therein. In yet other approaches, the magnetic grains 2120 of the second magnetic recording layer 2114 may include chemically ordered $L1_0FePtY$, where Y may include one or more of Ag, Cu, Au, Ni, Mn, Pd, etc. In some approaches where the magnetic grains 2120 of the second magnetic recording layer 2114 FePtY, the amount of Y therein may be in a range from about 5 at % to about 20 at. %. In further approaches where the magnetic grains 2120 of the second magnetic recording layer 2114 include FePtY, the amount of Pt therein may be 50 at. %, and the combined amount of Fe and Y may be 50 at % (i.e., Fe(50-n at. %)Y(n at. %)Pt(50 at. %)).

With regard to the third magnetic recording layer 2904, the magnetic grains 2906 therein may include chemically ordered $L1_0FePt$ in some approaches. In more approaches, the magnetic grains 2906 of the third magnetic recording layer 2904 may include chemically ordered $L1_0FePt$ having no Cu therein.

In still more approach s the magnetic grains 2906 of the third magnetic recording layer 2904 may include chemically ordered $L1_0FePtZ$, where Z may include one or more of Ag, Cu, Au, Ni, Mn, Pd, etc. In some approaches where the magnetic grains 2906 of the third magnetic recording layer 2904 include FePtZ, the amount of Z therein may be in a range from about 5 at % to about 20 at. %, In further approaches where the magnetic grains 2906 of the third magnetic recording layer 2904 include FePtZ, the amount of Pt therein may be 50 at. %, and the combined amount of Fe and Z may be 50 at % (i.e Fe(50-n at. %)Z(n at. %)Pt(50 at. %)).

In various approaches where the magnetic grains 2116 of the first magnetic recording layer 2112 include $L1_0FePtX$, the magnetic grains 2120 of the second magnetic recording layer 2114 include $L1_0FePtY$, and the magnetic grains 2906 of the third magnetic recording layer 2904 include $L1_0FePtZ$, the amounts of X, Y and Z their respective layers may be the same relative to one another. For example, in one particular approach, each of the magnetic grains 2116, 2120, 2906 of the first, second magnetic and third recording layers 2112, 2114, 2904 may include FePtCu with the same amount of Cu therein.

In various approaches where the magnetic grains 2116 of the first magnetic recording layer 2112 include $L1_0FePtX$, the magnetic grains 2120 of the second magnetic recording layer 2114 include $L1_0FePtY$, and the magnetic grains 2906 of the third magnetic recording layer 2904 include $L1_0FePtZ$, the amount of Y in the second magnetic recording layer 2114 may be less than the X amount and/or the Z amount in the first and third magnetic recording layers 2112, 2904, respectively. For instance, in one particular approach, each of magnetic grains 2116, 2120, 2906 of the first, second and third magnetic recording layers 2112, 2114, 2904 may include FePtCu, where the amount of Cu in the magnetic grains 2120 of the second magnetic recording layer 2114 is preferably less than the amount of Cu in the magnetic grains 2116 of the first magnetic recording layer 2112 and/or the magnetic grains 2906 of the third magnetic recording layer 2904. This avoids the presence of a Cu-rich second magnetic recording layer 2114 sandwiched between the first and third magnetic recording layers 2112, 2904.

In yet other approaches, the magnetic grains 2116 of the first magnetic recording layer 2112 may include $L1_0FePtX$, the magnetic grains 2120 of the second magnetic recording layer 2114 may include $L1_0FePt$, and the magnetic grains 2906 of the third magnetic recording layer 2904 may include $L1_0FePtZ$, where the X and Z amounts may each individually be in a range between about 5 at. % to about 20 at. %. In such a configuration, the $L1_0FePtX$ first magnetic recording layer 1212 may help improve crystalline orientation of the layer deposited thereabove; the $L1_0FePt$ second magnetic recording layer 2114 may improve media anisotropy and magnetic properties; and the $L1_0FePtZ$ third magnetic recording layer 2904 may reduce the Tc (Curie temperature) of the media and provide strain relaxation in the magnetic grains. In one particular approach, the magnetic grains 2116 of the first magnetic recording layer 2112 may include $L1_0FePtCu$, the magnetic grains 2120 of the second magnetic recording layer 2114 may include $L1_0FePt$, and the magnetic grains 2906 of the third magnetic recording layer 2904 may include $L1_0FePtCu$, where the Cu amounts may be the same or different in the first and third magnetic recording layers 2112, 2904.

In further approaches, there may a gradual gradient in the Cu amount extending throughout the composite magnetic grains 2910 in a thickness direction (e.g., direction oriented parallel to the substrate normal) such that the lowermost portions of each composite grain 2910 (e.g., the portions positioned closest to the substrate 2104) contain a greater amount of Cu than the uppermost portions thereof (e.g., the portions positioned closest to the capping layer(s) 2126).

Various non-limiting examples of the composition of the magnetic recording multilayer structure 2902 are provided below in Table 2.

TABLE 2

| $3^{rd}$ mag. rec. layer/ $2^{nd}$ mag. rec. layer/ $1^{st}$ mag. rec. layer | Alloying element amt. |
|---|---|
| FePt/FePt/FePtX | X: 5 at. % to 20 at. % |
| FePt/FePtY/FePtX | X: 5 at. % to 20 at. % |
| | Y: 5 at. % to 20 at. % |
| | Y < X |
| FePtZ/FePt/FePtX | X: 5 at. % to 20 at. % |
| | Z: 5 at. % to 20 at. % |
| | No constraints on relative amounts of Z and X, for example: Z < X, or Z > X, or Z = X |
| FePtPtZ/FePtY/FtX | X: 5 at. % to 20 at. % |
| | Y: 5 at. % to 20 at. % |
| | Z: 5 at. % to 20 at. % |
| | No constraints on relative amounts of Z and X; however the amount of Y relative to X and/or Z may be: Y < X, or Y < Z, or Y < X, Y, or Y = Z = X |

As additionally shown in FIG. 21, the third magnetic recording layer 2904 may include one or more segregant materials 2908. For instance, the third segregant 2908 of the third magnetic recording layer 2904 may include C, $SiO_2$, $TiO_x$, AlN, TaN, W, Ti, TiC, TiN, BC, BN, SiN, SiC, $TiO_2$, $CrO_x$, CrN, $AlO_x$, $Al_2O_3$, MgO, $Ta_2O_5$, $B_2O_3$, etc., and combinations thereof in various approaches. It is important to note that the third segregant 2908 may include one or more materials that are the same or different as those comprising the second segregant 2122 and/or the first segregant 2118.

Finally, it is also important to note that the magnetic recording multilayer structure 2902 of FIG. 29 may also include more than three magnetic recording layers in various approaches. For example, while not shown in FIG. 29, one or more additional magnetic recording layers may be positioned above the third magnetic recording layer 2904. At least one of these one or more additional layers may include a plurality of magnetic grains separated by a segregant, where the composition of the magnetic grains and the segregant may include any of the respective materials disclosed herein. However, in approaches where three or more magnetic recording layers are present, it is preferable for the Curie temperatures associated with the middle magnetic recording layer(s) to not exceed the Curie temperatures associated with the uppermost magnetic recording layer (the layer closest to the one or more capping layers) and/or the lowermost magnetic recording layer (the layer closest to the substrate). This may be achieved in approaches where the amount of any alloying element (e.g., Ag, Cu, Au, Ni, Mn, combinations thereof) in the magnetic grains of the middle magnetic recording layer(s) do not exceed the amount of said alloying elements in the uppermost magnetic recording layer and/or the lowermost magnetic recording layer. Where the alloying element is Cu, such a configuration avoids a magnetic recording multilayer structure with a Cu-rich middle section, as it is preferable to have the uppermost and/or the lowermost magnetic recording layers as the Cu-rich layers.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

It should also be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
   a substrate;
   a seed layer positioned above the substrate; and
   a magnetic recording layer structure positioned above the seed layer, the magnetic recording layer structure including:
      a first magnetic recording layer having a plurality of FePtCu magnetic grains and a first segregant, wherein a pitch between the FePtCu magnetic grains in the first magnetic recording layer is in a range from about 3 nm to 11 nm; and
      a second magnetic recording layer positioned above the first magnetic recording layer, the second magnetic recording layer having a plurality of FePt magnetic grains and a second segregant; and
      wherein a Curie temperature of the first magnetic recording layer is lower than a Curie temperature of the second magnetic recording layer.

2. The magnetic recording medium as recited in claim 1, wherein the first segregant and the second segregant are independently selected from a group consisting of: C, $SiO_2$, $TiO_2$, $TaO_x$, SiC, SiN, TiC, TiN, BN, BC, Cr-oxide, Cr-nitride, MgO, B and combinations thereof.

3. The magnetic recording medium as recited in claim 1, wherein a thickness of the first magnetic recording layer is in a range from greater than 0 nm to less than or equal to about 3 nm.

4. The magnetic recording medium as recited in claim 1, wherein a diameter of the FePtCu magnetic grains in the first magnetic recording layer is in a range from about 2 to 10 nm.

5. The magnetic recording medium as recited in claim 1, wherein an amount of Cu in the FePtCu magnetic grains in the first magnetic recording layer is in a range from about 5 at.% to 20 at.%.

6. The magnetic recording medium as recited in claim 1, wherein the FePtCu magnetic grains in the first magnetic recording layer further comprise at least one of: Ag, Au, Ni, and Mn.

7. The magnetic recording medium as recited in claim 1, wherein the FePt magnetic grains in the second magnetic recording layer further comprises Cu, wherein an amount of Cu in the second magnetic recording layer is less than an amount of Cu in the first magnetic recording layer.

8. The magnetic recording medium as recited in claim 1, wherein a thickness of the second magnetic recording layer is in a range from about 3 nm to 15 nm.

9. The magnetic recording medium as recited in claim 1, wherein a diameter of the FePt magnetic grains in the second magnetic recording layer is in a range from about 2 to 10 nm.

10. The magnetic recording medium as recited in claim 1, wherein the second magnetic recording layer does not include Cu.

11. The magnetic recording medium as recited in claim 1, wherein the magnetic grains of the second magnetic layer are physically characterized by growth directly on the magnetic grains of the first magnetic recording layer.

12. The magnetic recording medium as recited in claim 1, wherein magnetic grains of the first and second magnetic recording layers form composite magnetic grains extending through the magnetic recording layer structure, wherein a total thickness of the magnetic recording layer structure is at least 6 nm, and wherein the composite magnetic grains have an aspect ratio of at least 1.5.

13. The magnetic recording medium as recited in claim 1, wherein the seed layer includes MgO.

14. The magnetic recording medium as recited in claim 1, further comprising a thermal barrier layer positioned above the substrate and below the seed layer.

15. The magnetic recording medium as recited in claim 1, wherein the magnetic recording layer structure further comprises a third magnetic recording layer positioned above the second magnetic recording layer, the third magnetic layer having a plurality of FePt magnetic grains and a third segregant.

16. The magnetic recording medium as recited in claim 15, wherein the FePt magnetic grains of the third magnetic recording layer further comprise Cu.

17. The magnetic recording medium as recited in claim 15, wherein the third magnetic recording layer has a thickness in a range from greater than 0 nm and less than or equal to about 3 nm.

18. A magnetic data storage system, comprising:
    at least one magnetic head;
    a magnetic recording medium as recited in claim 1;
    a drive mechanism for passing the magnetic medium over the at least one magnetic head; and
    a controller electrically coupled to the at least one magnetic head for controlling operation of the at least one magnetic head.

19. A magnetic recording medium, comprising:
    a substrate;
    a seed layer positioned above the substrate; and
    a magnetic recording layer structure positioned above the seed layer, the magnetic recording layer structure including:
       a first magnetic recording layer having a plurality of FePtCu magnetic grains and a first segregant; and
       a second magnetic recording layer positioned above the first magnetic recording layer, the second magnetic recording layer having a plurality of FePt magnetic grains and a second segregant; and
       wherein a Curie temperature of the first magnetic recording layer is lower than a Curie temperature of the second magnetic recording layer,
       wherein a pitch between the FePt magnetic grains in the second magnetic recording layer is in a range from about 3 nm to 11 nm.

20. A magnetic recording medium, comprising:
    a substrate;
    a thermal barrier layer positioned above the substrate;

a seed layer positioned above the thermal barrier layer; and
a magnetic recording layer structure positioned directly above and on the seed layer, the magnetic recording layer structure including:
a first magnetic recording layer having a plurality of $L1_0$FePt—X magnetic grains and a first segregant, X being selected from a group consisting of: Ag, Cu, Au, Ni, Mn, and combinations thereof; and
a second magnetic recording layer positioned above the first magnetic recording layer, the second magnetic recording layer having a plurality of $L1_0$FePt magnetic grains and a second segregant;
wherein a Curie temperature of the first magnetic recording layer is lower than a Curie temperature of the second magnetic recording layer,
wherein an amount of X in the FePt—X magnetic grains in the first magnetic recording layer is between about 5 at % and 20 at.%,
wherein at least one of the following characteristics is present in the magnetic recording layer structure:
a pitch between the $L1_0$FePt—X magnetic grains in the first magnetic recording layer is in a range from about 3 nm to 11 nm, and
a pitch between the $L1_0$FePt magnetic grains in the second magnetic recording layer in a range from about 3 nm to 11 nm.

21. The magnetic recording medium as recited in claim 20, wherein the first segregant and the second segregant are independently selected from a group consisting of: C, $SiO_2$, $TiO_2$, $TaO_x$, SiC, SiN, TiC, TiN, BN, BC, Cr-oxide, Cr-nitride, MgO, B and combinations thereof.

22. The magnetic recording medium as recited in claim 20, wherein a thickness of the FePt—X magnetic grains in the first magnetic recording layer is in a range from greater than 0 nm to less than or equal to about 3 nm, wherein a thickness of the FePt magnetic grains in the second magnetic recording layer is between in a range from about 3 nm to about 15 nm.

23. The magnetic recording medium as recited in claim 20, wherein the seed layer includes MgO.

24. The magnetic recording medium as recited in claim 20, wherein the magnetic recording layer structure further comprises a third magnetic recording layer positioned above the second magnetic recording layer, wherein the third magnetic layer has a plurality of FePt magnetic grains and a third segregant, wherein the FePt magnetic grains of the third magnetic recording layer optionally include an additional element selected from a group consisting of: Ag, Cu, Au, Ni, Mn, and combinations thereof.

* * * * *